United States Patent
Haaland et al.

(10) Patent No.: US 10,118,058 B2
(45) Date of Patent: *Nov. 6, 2018

(54) FIRE SUPPRESSION SYSTEMS

(71) Applicant: Eclipse Aerospace, Inc., Albuquerque, NM (US)

(72) Inventors: Peter D. Haaland, Fraser, CO (US); Ken Harness, Albuquerque, NM (US)

(73) Assignee: Eclipse Aerospace, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,079

(22) Filed: Jan. 20, 2017

(65) Prior Publication Data
US 2017/0128758 A1    May 11, 2017

Related U.S. Application Data

(63) Continuation of application No. 14/451,283, filed on Aug. 4, 2014, now Pat. No. 9,550,081, which is a (Continued)

(51) Int. Cl.
| A62C 3/07 | (2006.01) |
| A62C 3/06 | (2006.01) |
| A62C 99/00 | (2010.01) |
| A62C 3/08 | (2006.01) |
| B64D 25/00 | (2006.01) |
| F02C 7/25 | (2006.01) |

(52) U.S. Cl.
CPC ............... *A62C 3/06* (2013.01); *A62C 3/065* (2013.01); *A62C 3/08* (2013.01); *A62C 99/0009* (2013.01); *A62C 99/009* (2013.01); *A62C 99/0018* (2013.01); *B64D 25/00* (2013.01); *F02C 7/25* (2013.01); *F05D 2260/80* (2013.01)

(58) Field of Classification Search
CPC ..... F02C 7/25; A62C 3/06; A62C 3/08; A62C 3/065; A62C 99/0018; A62C 99/009; A62C 99/0009; B64D 25/00; F05D 2260/80
USPC ........ 169/5, 6, 9, 11, 16, 46, 47, 54, 56, 62; 60/30.091; 252/2, 4, 5, 6
See application file for complete search history.

(56) References Cited

U.S. PATENT DOCUMENTS 3,885,631 A * 5/1975 McBride ............... A62C 3/04 169/11
4,481,119 A * 11/1984 Rhein ............... A62D 1/0014 169/46
(Continued)

Primary Examiner — Steven J Ganey
(74) Attorney, Agent, or Firm — Nelson Mullins Riley & Scarborough LLP

(57) ABSTRACT

A method of fire suppression may include injecting a reactive agent into a reaction zone to produce a catalytically active species for fire suppression and conveying the catalytically active species to a fire to catalytically interfere with flame chemistry of the fire. Fire in a fuel tank may be suppressed by injecting the reactive agent into a convective flow of a mixture of fuel and oxidizer in a fuel tank, the reactive agent reacting in the fuel tank to release a species which catalytically interferes with flame chemistry to suppress fire in the fuel tank. Fire at an airplane crash may be suppressed by releasing the reactive agent from the container at the crash site to produce an active species to catalytically interfere with a fire at the crash site.

12 Claims, 22 Drawing Sheets

Related U.S. Application Data continuation of application No. 11/929,743, filed on Oct. 30, 2007, now Pat. No. 9,283,415, which is a continuation of application No. 11/331,524, filed on Jan. 12, 2006, now Pat. No. 7,757,776.

(60) Provisional application No. 60/699,972, filed on Jul. 15, 2005, provisional application No. 60/694,854, filed on Jun. 29, 2005, provisional application No. 60/643,275, filed on Jan. 12, 2005.

(56) References Cited

U.S. PATENT DOCUMENTS

| | | | | |
|---|---|---|---|---|
| 4,633,967 | A * | 1/1987 | Kranz | A62C 3/06 169/62 |
| 5,626,786 | A * | 5/1997 | Huntington | A62D 1/0014 169/46 |
| 6,082,464 | A * | 7/2000 | Mitchell | F02C 7/25 169/46 |
| 6,935,433 | B2 * | 8/2005 | Gupta | A62C 3/002 169/62 |
| 7,757,776 | B2 * | 7/2010 | Haaland | A62C 3/06 169/11 |
| 9,550,081 | B2 * | 1/2017 | Haaland | A62C 3/06 |

* cited by examiner

63 Gear Box

FIRE SUPPRESSION SYSTEMS

CROSS REFERENCE TO RELATED APPLICATIONS

The present application is a continuation of U.S. application Ser. No. 14/451,283, filed Aug. 4, 2014 (now U.S. Pat. No. 9,550,081), which is a continuation of U.S. application Ser. No. 11/929,743, filed Oct. 30, 2007 (now U.S. Pat. No. 9,283,415), which is a continuation of U.S. application Ser. No. 11/331,524 (now U.S. Pat. No. 7,757,776), filed Jan. 12, 2006, which claims priority to U.S. provisional application Ser. No. 60/699,972, filed Jul. 15, 2005, U.S. provisional application Ser. No. 60/694,854, filed Jun. 29, 2005, and U.S. provisional application Ser. No. 60/643,275 filed Jan. 12, 2005, the entire disclosure of each of which is hereby incorporated by reference herein.

FIELD OF THE INVENTION

The present invention relates to techniques for fire suppression and particularly, fire suppression techniques using catalytic suppressants.

BACKGROUND OF THE INVENTION

Many techniques are known for fire suppression including techniques using catalytic suppressants. What are needed are improved techniques for fire suppression and detection as well as more convenient techniques for testing such systems.

SUMMARY OF THE INVENTION

Figure 1:
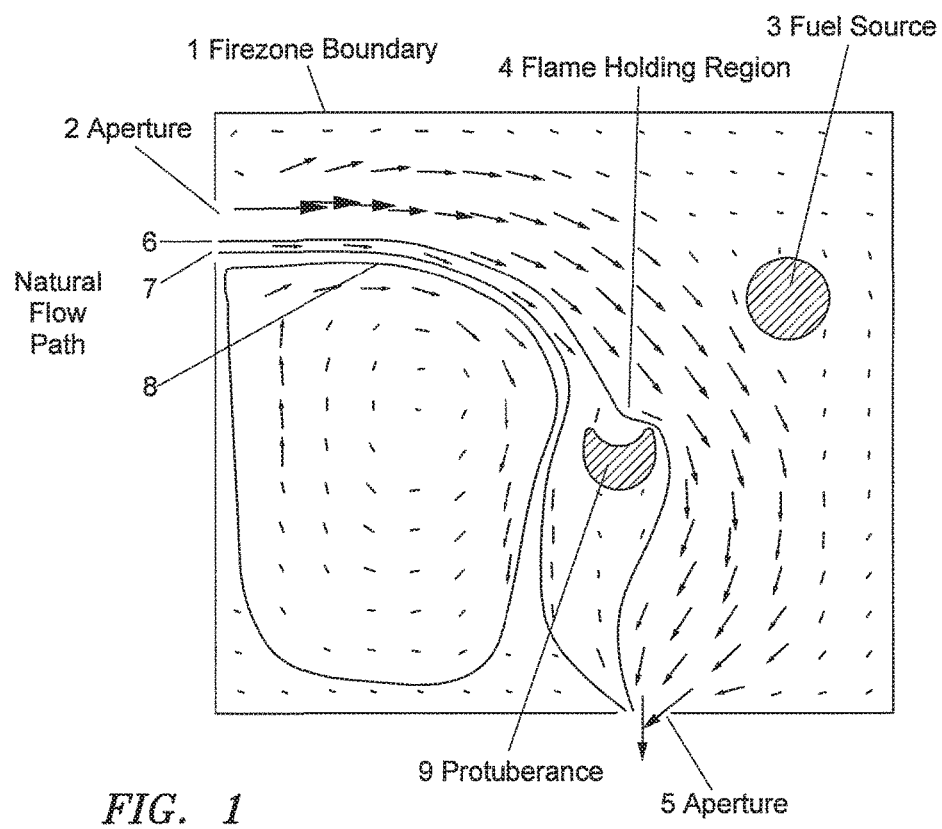
FIG. 1 is a schematic rendering of a generalized fire zone.

In a first aspect, a fire suppression system is disclosed including a jet engine having a source of fuel, an engine air intake and an outlet through which a combusted air fuel mixture is exhausted at a high speed along a first flow path to apply thrust; a streamlined enclosure forming a volume around the jet engine, the volume having at least one air intake and a second flow path along which air flows at a lower speed through the volume when the jet engine is producing thrust; a reactive agent; a reaction zone in which the reactive agent reacts to produce a catalytic fire suppressing agent; and an injection point for selectively releasing the reactive agent for contact with the reaction zone so that the catalytic fire suppressing agent is transported by the air flow path to suppress a fire.

In another aspect, a fire suppression system is disclosed having a jet engine characterized by an air flow path surrounding the engine and by an area adjacent the air flow path in which flame attachment may occur during a fire; and a fire suppressing agent which reacts to produce a catalytic fire suppression agent selectively transported by the air flow path for catalytic suppression of a fire which occurs in the area.

In a still further aspect, a fire suppression system is disclosed having an injection point in the vicinity of an air path along which air flows adjacent a jet engine during operation of the jet engine; a source of a reactive agent which reacts to form chemical species that catalytically interfere with flame chemistry; and a control system for injecting the reactive agent through the injection point to form the chemical species for transport by the air path to catalytically suppress fire along the air path.

In another aspect, a method of fire suppression may include providing a supply of a reactive agent in a container, injecting the reactive agent into a reaction zone to produce a catalytically active species for fire suppression and conveying the catalytically active species to a fire to catalytically interfere with flame chemistry of the fire. The catalytically active species may be conveyed via a naturally occurring flow path leading to flame attachment regions in the fire.

The method may further include selecting a test agent which is transported along the flow paths in generally the same manner as the catalytically active species is conveyed along the flow paths and testing delivery of a sufficient quantity the catalytically active species to the flame attachment regions to suppress fire in the flame attachment regions by testing delivery of that sufficient quantity of the test agent along the naturally occurring flow paths. Fire suppression may be achieved with at least 10%, 50% or 75% less reactive agent than an amount of a non-reactive fire suppression agent required to suppress the fire by flooding the fire.

The catalytically active species may be injected toward a flame attachment region in the fire in a counter flow direction against a flow of a naturally occurring flow path leading to the flame attachment region to increase a dwell time of the catalytically active species at the flame attachment region. The fire to be suppressed may be a fire in a physical structure including fuel and an oxidizer and the reaction zone may be along a naturally occurring flow path in the structure occurring during the fire. The reaction zone may be external to the fire or in the container. A sufficient quantity of a gaseous propellant may be dissolved in the reactive agent in the container to maintain the reactive agent in a liquid form from ambient conditions to −65° C.

In another aspect, a method of suppressing fire in a fuel tank may include providing a supply of a reactive agent in a container and injecting the reactive agent into a convective flow of a mixture of fuel and oxidizer in a fuel tank, the reactive agent reacting in the fuel tank to release a species which catalytically interferes with flame chemistry to suppress fire in the fuel tank. The method may include detecting the fire in the fuel tank before detonation of supersonic combustion waves to decrease the velocity of the combustion waves and reduce the prospects of detonation and/or detecting initial subsonic combustion of the mixture of fuel and oxidizer and injecting the reactive agent fast enough to prevent supersonic combustion in the fuel tank and/or detecting initial subsonic combustion waves in the fuel tank with a high speed optical or acoustic ignition detector and triggering a rapid injection of the reactive agent sufficient to suppress the fire before detonation of the fuel tank. The container may be mounted in the fuel tank.

In a still further aspect, a method of reducing fires from an airplane crash may include carrying a supply of a reactive agent in a container on the airplane and releasing the reactive agent from the container at the crash site to produce an active species to catalytically interfere with a fire at the crash site. The container may be delivered as a projectile from the airplane to the crash site just before the crash. The reactive agent may be released from the container while carried on the airplane. The active species may be produced at the crash site by reaction with the fire at the crash site.

DETAILED DESCRIPTION OF THE EMBODIMENTS

Referring now to FIG. 1, a fire zone may be analyzed as having four characteristics:

1. A volume that is partially enclosed by a boundary 1;
2. One or more apertures through which oxidizer may enter and exit the partially enclosed volume; in FIG. 1 these are denoted by 2 and 5;
3. A source of combustible fuel; in FIG. 1 this is denoted by 3; and
4. A source of ignition.

An example of a fire zone may be the ventilated duct over a deep fat fryer. The duct has an enclosed volume with one or more entrance and exit apertures, congealed fats provide fuel, and ignition occurs from a spark on the hood's blower motor or a hot particle from the cooking surfaces. Another example of a fire zone may be the nacelle of a jet engine; it is actively ventilated to cool the internal components, hydrocarbons or transmission fluids provide fuel, and hot surfaces or electrical sparks provide ignition. Additional examples of fire zones may be the engine compartments of motor vehicles, ventilated cabinets that house computers, telecommunication switching stations, natural gas pipelines, fuel tanks, and other enclosures with ignition sources and apertures that admit fuel and oxidizer.

An oxidizer is a material that reacts with fuel to release energy. Air is the most common gaseous oxidizer. Other gaseous oxidizers include pure oxygen and gas mixtures other than air that contain oxygen or ozone, chlorine gas, nitrous oxide, nitrogen trifluoride, and the like. Common liquid and solid oxidizing agents include bromine, bromates, chlorinated isocyanurates, chlorates, chromates, dichromates, hydroperoxides, hypochlorites, inorganic peroxides, ketone peroxides, nitrates, nitric acid, nitrites, perborates, perchlorates, periodates, permatnganates, peroxides, peroxyacids, and persulphates.

Fuel, oxidizer, and a source of ignition are required to start a fire. Once ignited the fire itself serves as a continuing ignition source, so that only flows of fuel and oxidizer are needed to continue burning. There are at least five ways to suppress a fire:

(i) Restricting the flow of fuel to the fire zone;
(ii) Displacing or restricting the flow of oxidizer with inert gases (e.g., $N_2$, $CO_2$, or Ar);
(iii) Removing heat from the combustion zone to cool it below the temperature required for self-sustained burning (e.g., vaporize liquid water or pyrolyze $NaHCO_3$);

(iv) Exploiting fluid mechanical shear to preclude mixing of oxidizer and fuel (i.e., blow the fire out);

(v) Interfering with flame chemistry (e.g. Halons, labile bromine suppressants as described in U.S. Pat. No. 5,626,786, $CF_3I$, etc.).

In practice, more than one of these mechanisms may operate simultaneously. For example, Halon 1211 ($CF_2BrCl$) is a liquid that is vaporized by the heat of a fire according to (iii) above, displaces oxygen according to (ii) above, and generates Br and Cl atoms that interfere with flame chemistry according to (v) above. Similarly, water as a suppression agent vaporizes according to (iii) above and displaces oxidizer according to (ii) above.

The natural flow paths of oxidizer and/or fuel may be exploited to efficiently transport reactive suppression agents to flame holding regions within the fire zone. This use of natural flows that target flame holding regions allows fires to be suppressed with substantially smaller quantities of agent than are required for a total flooding method. Total flooding requirements are conventionally determined by the volume of the fire zone and the ventilation rate in order to maintain a uniform agent concentration above a threshold for a predetermined period of time. To the extent that the flooded agent bypasses flame holding regions, it is ineffective at suppressing the fire. The amount of suppressant required for fire suppression by flooding may advantageously be reduced or eliminated by using natural flow paths to transport suppressants to the fire zone. Reactive suppression agents are materials that interact chemically or physically in the fire zone to produce chemical species that catalytically interfere with flame chemistry.

In designing a fire suppressant system, the natural flow paths or fields of oxidizer and fuel in the fire zone may be characterized. The term "natural flow path" is intended to include the set of trajectories of oxidizer and fuel through the fire zone both under its normal operating conditions and under conditions where a fire is present within the fire zone. In many flow conditions the natural flow path may be described by streamlines, which are lines in a flow field whose tangent at any point is in the same direction as the flow at that point. Alternatively, local velocity fields may be used directly to evaluate the natural flow paths through the fire zone. The natural flow path, whether laminar or turbulent, subsonic or supersonic, inviscid or viscid, has the feature that it transfers momentum to the suppression agent and can therefore be used to transport agent within the fire zone. It should be noted that the natural flow path may be the flow path of any fluid or gas that naturally exists in the partially enclosed space. A variety of methods are available to characterize these flows including, but not limited to, flow visualization, computational fluid dynamics, measurement of flow velocities and directions, and combinations thereof. Flow visualization involves viewing, photographing, or videotaping the motion of particles, streamers, smokes, or other visible media that follow streamlines in a flow field. Computational fluid dynamics involves solving the equations of motion for gases and liquids in a flow including conservation of energy and momentum by mathematically modeling the fire zone flows as an ensemble of finite spatial elements. Measurement of flow velocities is accomplished by placing flow transducers (e.g., pitot tubes, turbines, mass flow meters, and the like) in the flow field and monitoring electrical signals that represent flow velocities and directions. These techniques may be used singly or in combinations to quantitatively characterize the flow fields of oxidizer and fuel in the fire zone.

In designing a fire suppressant system, it is advantageous to identify flame holding or attachment regions within the fire zone. Flame attachment or flame holding are well known to those practiced in the art of combustion science and are described, for example, in Combustion Theory by Forman Williams (New York: Addison-Wesley) 1985, especially chapter 12, and Principles of Combustion by Kenneth Kuo (New York: Wiley) 1986, especially chapter 9. Flame holding regions are locations where the vorticity or recirculation of the oxidizer flow is combined with a source of fuel to produce the potential for a spatially stable flame. This process is also known as flame attachment or flame stabilization. Laminar (FIG. 2) or turbulent (FIG. 3) flows of air across a step or around a blunt object, such as step 23 or 31, generate flame holding regions that can be activated when fuel is introduced into recirculating flows 24.

Figure 4:
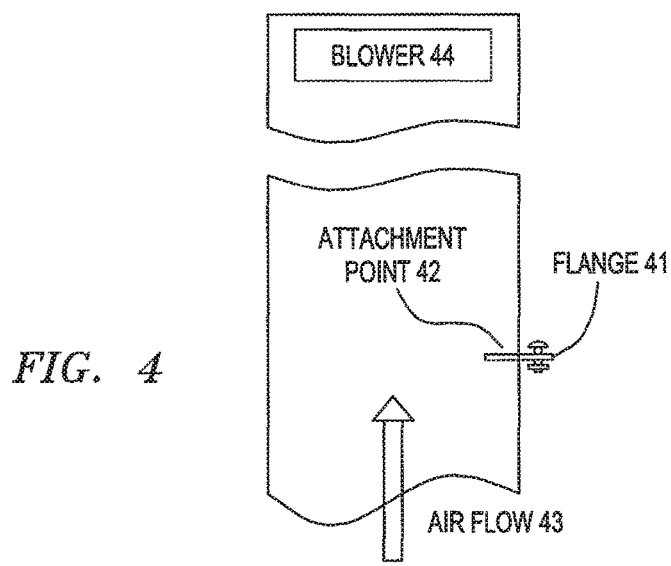
FIG. 4 is a sectional view of a vertical duct showing a fire zone and a flame holding region.

An example of a flame holding region is illustrated in the generic fire zone of FIG. 1 where fuel from source 3 impinges on and wets the solid protuberance 9. Air that is supplied from entrance 2 recirculates in the vicinity of the protuberance 9 and attaches a flame thereto after the fuel-air mixture is ignited. Another example of a flame holding region, shown in FIG. 4, is the cross-section of a vertical duct. Airflow 43 is driven by suction from a blower 44 mounted at the exhaust of the duct. Flanges 41 that connect segments of duct protrude into the fire zone and may be coated with combustible cooking residues such as congealed fats or oils. These protrusions may provide attachment points for flames in the flow field of the duct because they combine recirculating flows of oxidizer and fuel.

Figure 2:
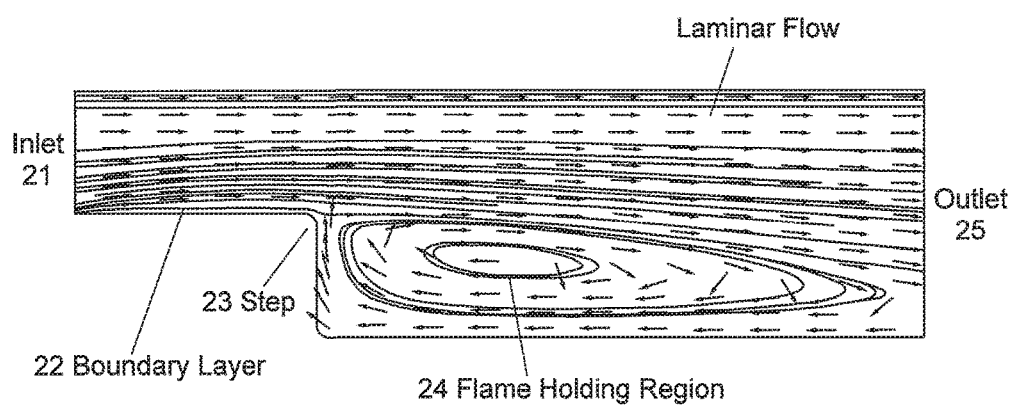
FIG. 2 is an exemplar computational fluid dynamics result showing streamlines and velocity vectors for laminar air flow past a step that produces a recirculating zone that may produce a flame holding region.

Another example of natural flows and a flame holding region is shown in the cross sectional view of a step in FIG. 2. Air enters at the inlet 21 and a boundary layer 22 is established before the flow passes over a step 23. The step induces a recirculating air flow that is depicted by velocity vectors (arrows) and streamlines (solid lines) in FIG. 2. The geometry of the step induces recirculation that permits flame holding in the region indicated by closed streamlines 24. Air exits through another aperture 25.

Figure 3:
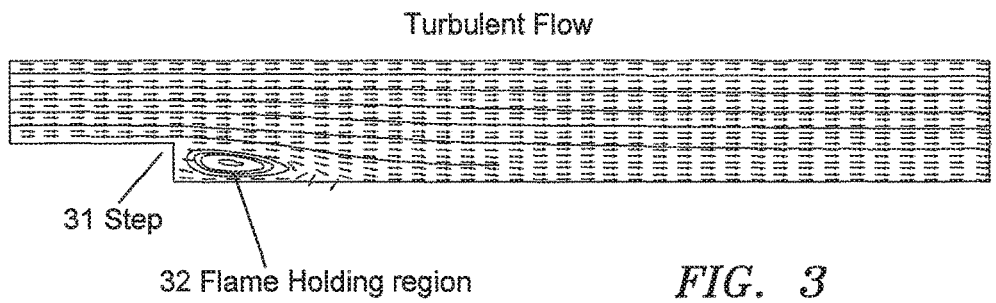
FIG. 3 is an exemplar computational fluid dynamics result showing streamlines and velocity vectors for turbulent air flow past a step that produces a recirculating zone that may produce a flame holding region.

The flow field in FIG. 2 is laminar; similar results are obtained for turbulent flow over a step 31 as shown in FIG. 3. A flame holding region 32 develops downstream from the step 31 and is indicated by recirculation that attaches a flame to the region in the presence of fuel and a source of ignition. As in FIG. 2 the local velocity vectors are denoted by arrows and solid lines trace streamlines in the turbulent flow.

Figure 5:
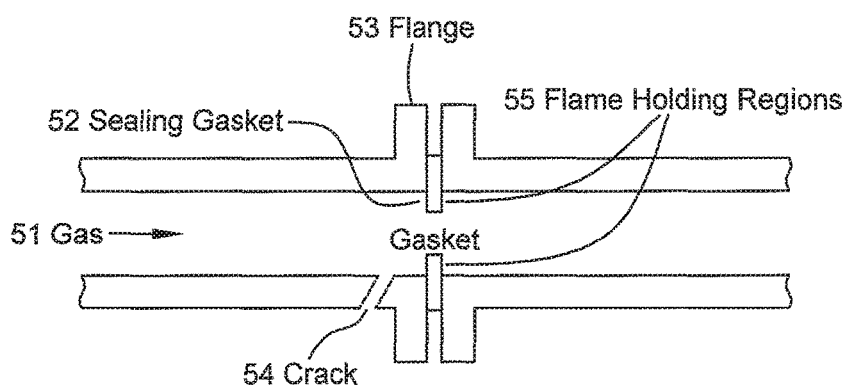
FIG. 5 is a sectional view of a horizontal duct showing a fire zone and a flame holding region.

Referring now to FIG. 5, another example of flame holding is illustrated by a cross-sectional view of tubing joined by flange 53 where a low pressure flammable gas 51 such as silane ($SiH_4$), hydrogen ($H_2$), or methane ($CH_4$) flows through segments of pipe or tubing. A sealing gasket 52 protrudes into the fuel flow, and air enters through a crack 54 in the weld near the joint. A recirculation zone that combines fuel, oxidizer, and a recirculation downstream of the protruding gasket creates a flame holding region at positions indicted by 55.

Figure 6:
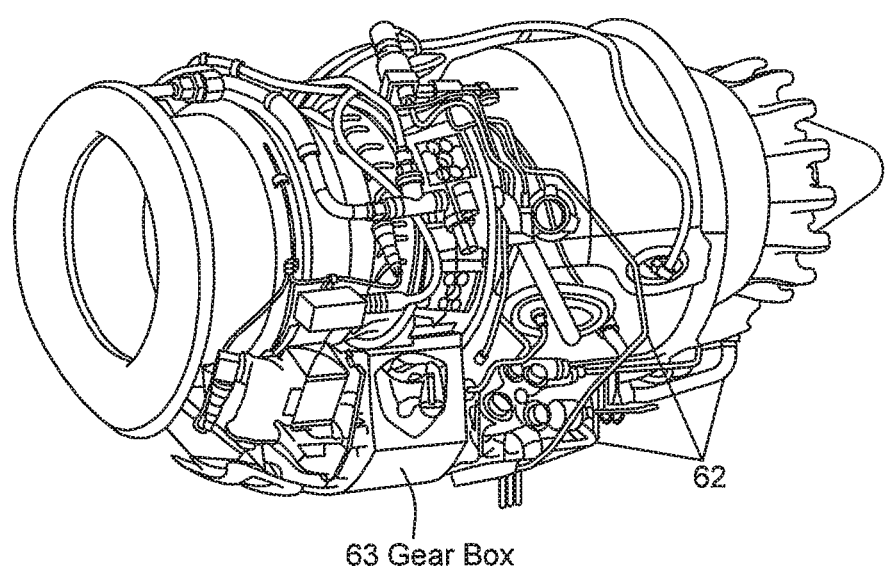
FIG. 6 is a perspective view of the internal surface that defines the volume of a jet engine showing protuberances that influence the flow of air and fuel.
Figure 7:
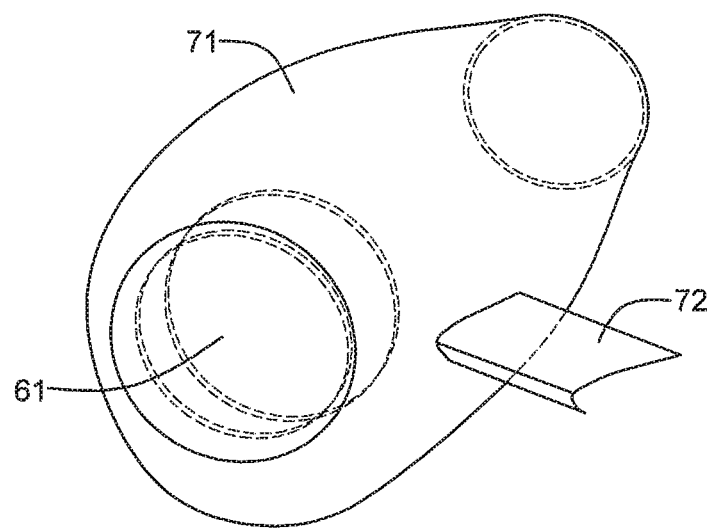
FIG. 7 is a perspective view of the external boundary surface of a jet engine nacelle.
Figure 8:
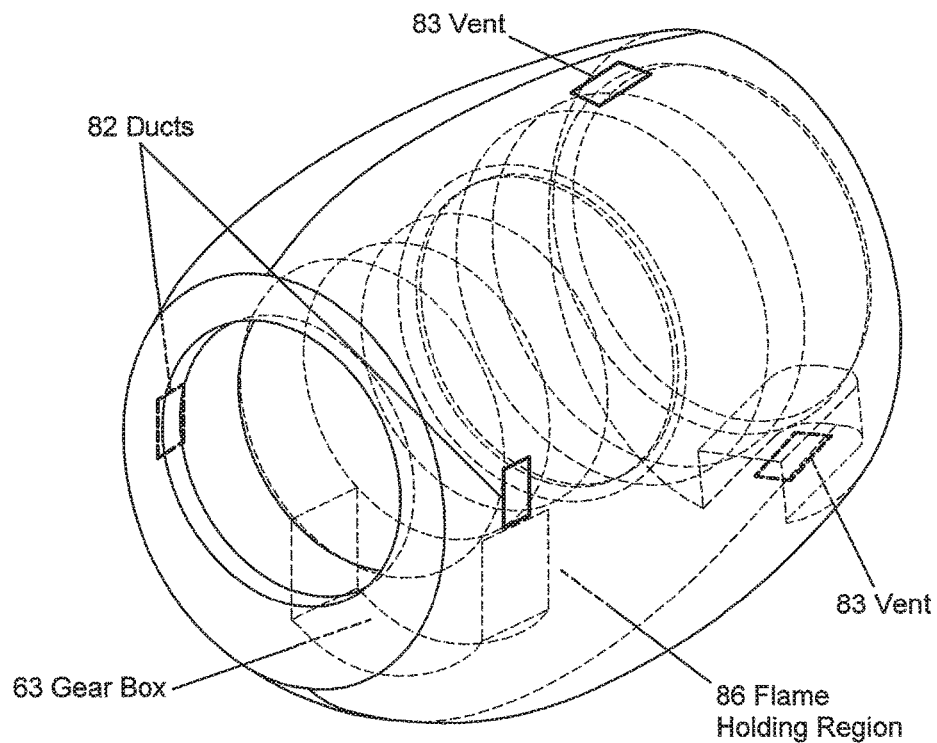
FIG. 8 is a perspective view of a jet engine nacelle flow volume showing the inlet and exhaust points for air flow through the fire zone.

Yet another example of flame holding regions may be found within the nacelle of a jet engine in FIGS. 6, 7, and 8. The nacelle is the toroidal volume that is enclosed by the engine core (FIG. 6) and the external skin of the aircraft (FIG. 7). Referring to FIG. 8, air enters through two submerged ducts 82 and flows around protuberances such as the auxiliary gear box 63 before exiting at one of two louvered vents 83.

The amount of agent that follows natural flow paths to flame holding regions can be determined by standard methods familiar to those practiced in the art of chemistry. For example, a gaseous agent may be monitored by placing a mass spectrometer or optical detector at the flame holding region and then recording the flux of agent that reaches that location following discharge of the system into a natural flow within the fire zone. Alternatively, computational fluid dynamic techniques may be applied to calculate the proportion of injected agent that is delivered to the flame holding regions.

The fraction of agent that arrives at a flame holding region in a conventional total flooding system is equal to the fraction of the total fire zone volume that contains flame holders. The amount of agent targeted to the flame holding regions may exceed this fraction by at least 10%, preferably 50%, and most preferably by at least 75% above the uniform dose that occurs in a total flooding application.

The impact of targeting suppressant into natural flows that pass through flame holding regions substantially reduces the amount of agent needed to extinguish the fire. For example, consider a fire zone that has a volume of 100 liters and that contains flame holding regions whose total volume is 2 liters. If the concentration of agent required to suppress the fire is 1 gram per liter then a total mass of 100 grams would be needed conventionally to flood the fire zone with an extinguishing concentration. Using natural flows to increase the proportion of agent that reaches the flame holding regions by 10% from the flooding value reduces the quantity of agent required to 90.9 grams, according to the formula $$\frac{m}{V}(1+ef) \geq ec$$

wherein ec is the extinguishing concentration or the minimum concentration of suppressing agent that is required to suppress the fire(s) locally at the flame hold region(s), m is the mass of the suppressing agent injected into the fire zone, V is the volume of the fire zone, and ef is the enhancement factor that results from injection into natural flows that pass through flame holding regions. In the specific example cited above ec=1 gram per liter, V is 100 liters, and ef is 10%=0.1. Solving this equation form yields $$m \geq \frac{ec \cdot V}{1+ef} = \frac{1*100}{1.1} = 90.9 \text{ grams}$$

An increase in the proportion of agent that targets flame holding regions by 50% (ef=0.5) would require only 66.7 grams in this example, and one that increases the proportion by 75% would require only 57 grams of agent. Similar results for fire zones with different volumes, flame holding regions with different volumes, and agents with different extinguishing concentrations are apparent from consideration of the equation used in this example, as are adjustments that are required to compensate for agent that is exhausted through one or more of the apertures in the fire zone.

According to this formula the maximum possible enhancement results when the agent is injected exclusively into natural flows that pass into the flame holding regions. In the preceding example 2 grams would be required to provide an extinguishing concentration of 1 gram per liter in the two liters of flame holding regions, so the maximum enhancement factor is 4900%=49:

$$m = 2 \text{ g} \geq \frac{1 \text{ gl}^{-1} \cdot 100 \text{ l}}{(1+49)}$$

Summarizing, reduction in the quantity of agent that is required to suppress a fire may be accomplished by targeting its injection into natural flows that transport it to flame holding regions. This reduction is quantifiable as an enhancement factor that can be measured directly by sampling the concentration of agent in flame holding regions of fire zones using mass spectrometry, optical spectrometry, gas chromatography, or the like and calculating the ratio by which this quantity exceeds the ratio of agent mass to the volume of the complete fire zone. Alternatively, one can quantify this enhancement factor by titrating fire suppression with agent mass and comparing with the mass of agent required for suppression by total flooding (i.e. without using natural flows to target flame holding regions).

It is advantageous to select a reactive suppressing agent that, when introduced into the environment of the fire zone, will produce species that catalytically inhibit combustion. Species that catalytically inhibit combustion accelerate the rates for recombination of flame radicals such as OH, H, and other reactive fragments that are intermediates in combustion. Examples of such catalytic species include, but are not limited to, atomic Br, Cl, and I, and molecular HBr, HCl, and HI. Agents that produce these catalytic species include hydrocarbon and hydrofluorocarbon species that contain Br, Cl, or I, for example:

$CF_3Br$+heat=>$CF_3$+Br $CF_3Br$+H=>$CF_3$+HBr.

These agents rely on the heat and the presence of hydrogen atoms in the fire zone to release the catalytic agent into the fire. Other examples of reactive agents are labile bromine species, such as $PBr_3$, described in U.S. Pat. No. 5,626,786, which have weaker bonds to bromine than corresponding halocarbons. Labile bromine suppressants such as $PBr_3$ react with heat and atomic species in the combustion zone as follows:

$PBr_3$+heat=>$PBr_2$+Br $PBr_2$+heat=>PBr+Br

PBr+heat=>P+Br $PBr_3$+H=>$PBr_2$+HBr.

$PBr_2$+H=>PBr+HBr

PBr+H=>P+HBr

Labile bromine agents also deliver bromine into the fire zone through hydrolysis by ambient moisture as follows:

$PBr_3$+3$H_2O$=>3HBr+$P(OH)_3$.

The catalytic potency of halogen atoms is a result of reactive cycles in which the catalyst is neither consumed nor produced; rather it speeds up the conversion of flame species that would otherwise undergo exothermic reactions that support the fire. For example, oxidation of hydrogen atoms (to water) is the most energetic aspect of hydrocarbon combustion. One example of catalytic action by atomic Br is

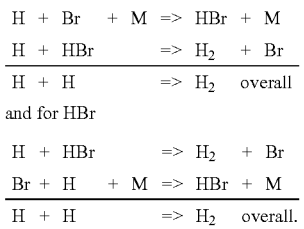

and for HBr

Conversion of atomic to molecular hydrogen prevents its oxidation, reduces the heat release in the combustion zone, and thereby extinguishes the fire. Other catalytic reactions involving OH radicals, fuel radicals, and so forth are possible and may contribute to extinguishment, as will be obvious to those practiced in the art of chemical kinetics.

Catalytic species may be generated by reaction of agent with other species in the air flow (e.g., $O_2$, $N_2$, $H_2O$), the fuel flow (e.g., hydrocarbon, alcohol, or other combustible media), or ambient surfaces (e.g., aluminum, steel). For example, $PBr_3$ reacts with moisture on surfaces and in air according to the formula:

$$PBr_3 + 3H_2O \Rightarrow 3HBr + H_3PO_3.$$

HBr produced by this interaction with moisture participates in the same catalytic cycles for fire suppression is described above.

In addition to the catalytic activity for flame suppression by atomic bromine, chlorine, and iodine, other atomic or molecular species may be used to catalytically interfere with flame chemistry. For example, solid particles of thermooxidatively stable oxides such as $SiO_2$ (silica), $Al_2O_3$ (alumina), and the like provide non-flammable surfaces that catalyze recombination of atomic species in a hydrogen-oxygen flame. Such particles may be generated by, for example, the reaction of $SiBr_4$ or $AlCl_3$ with oxygen and water in the combustion zone to produce very small (nanometers to a few micrometers, also called fumed) oxide particles. Particles with very small diameters are particularly effective in this regard because they present a large surface area per unit mass of agent.

Catalytic species such as Br, Cl, and I atoms are produced by pyrolysis of conventional Halons such as $CF_3Br$ (Halon 1301) and $CF_2BrCl$ (Halon 1211), $CF_3I$, and the like, however these agents may be less efficient than the labile bromine materials. The catalytically active halogens are tightly bound to carbon and are thus more difficult to activate in a flame and may have undesirable environmental impacts that make them less attractive as agents than the labile bromine materials. The effectiveness of labile bromine materials including $PBr_3$, $POBr_2$, $SOBr_2$, $BrF_3$, $BrF_5$, $PBr_5$, $TiBr_4$, $SiBr_4$, IBr, CuBr, NOBr, BrF, $BBr_3$, and BrCl as described in U.S. Pat. No. 5,626,786 permits fire suppression with smaller masses and volumes of agent than Halons. Fire suppression agents with labile, that is weakly bound, chlorine or iodine atoms are also effective agents because these agents release atomic chlorine or iodine atoms that catalytically inhibit combustion.

In designing a fire suppressant system, the selection of locations and propulsion techniques for agent injection into the fire zone is also important. The approach requires identification of flame holding regions and the flow fields for oxidizer and fuel. The location of agent injection is chosen to facilitate agent transport to the flame holding regions by the natural oxidizer (e.g., air) and fuel (e.g., hydrocarbon) flows. This reduces the weight and complexity of the fire suppression system over conventional systems because the natural flow fields are used to transport the agent to flame holding regions in the fire zone.

Suppressing agents may be stored in a vessel, cartridge, or container that protects them from the environment until they are required for fire extinguishment. The inside of this vessel, cartridge, or container is connected to the fire zone through an orifice, aperture, or opening through which suppressant is conducted during fire extinguishment. In order to propel or inject the agent into a natural flow that leads to a flame holding region, momentum must be supplied to the agent by a propellant. This propellant can be physical, as by a pressurized gas or fluid; chemical, as by a deflagrating solid gas generating cartridge; mechanical, as by a spring and piston; electromechanical, as by a pump; or fluid mechanical, as by a venturi that is generated by the natural flow at the orifice. In operation, a source of momentum (i.e., a propellant) may be used to propel the agent from a vessel through an orifice to transport the agent into a natural flow that leads to flame holders within the fire zone.

Propulsion techniques depend on the phase (solid, liquid, gas) of the agent and on the nature of the flow field into which it is injected (laminar, turbulent, mixed). Generally a pressure in excess of ambient is applied to the agent and it is delivered through a valve or nozzle into the fire zone. This pressure can be generated by static pressurization of the agent or dynamic pressurization such as by a mechanical spring or a deflagrating solid, inert gas generator. The nature of the pressurization, its magnitude, time dependence, and the geometry of the nozzle or tubing are chosen to optimize agent transport by the natural flows into the flame holding regions of the fire zone, and thereby to minimize the size and complexity of components that would otherwise be required to disperse agent uniformly and completely into spaces with complex geometries. Flames within a fire zone may have variable intensities and may be present at one or more flame holding regions within the fire zone. In addition, the heat release and chemical reactions in the flames cause pressure changes that alter the flow fields for oxidizer and fuel when a fire is present. The influence of combustion on the natural flow fields may be modeled using the methods of computational fluid dynamics or preferably by extinguishment of test fires that are set under representative pressure, flow, temperature, and heat transfer conditions.

In designing a fire suppression system, an analysis of the flow fields in a fire zone including identification of flame holding regions therein may be important. The selection of a suppressing agent whose introduction into the fire zone generates catalytically active species that interfere with combustion chemistry to extinguish the fire is important. Locations and propulsion methods for agent injection may be chosen to maximize transport of the agent by natural flows to the flame holding regions within the fire zone. Preferably, tests under representative fire conditions may be used to confirm the validity of the suppression method and the efficacy with which the agent, injection point, and propulsion method have been chosen.

The quantity of agent required to suppress fires within the fire zone may be minimized because agent is effectively transported by existing fuel and oxidizer flows to regions where its suppression effects are most pronounced.

The mass, volume, and complexity of plumbing elements such as tubing, valves, manifolds, and the like are minimized because natural flows transport the agent to flame holding regions within the fire zone.

The impact of the agent on the environment generally, and on the environment within the fire zone particularly, may be minimized because the quantity of agent is minimized. Environmental impact includes contributions to stratospheric ozone depletion, global warming, and other consequences of chemical release that are familiar to those practiced in the art of environmental sciences.

Also, the selection of suppression agents that rapidly release their active form in the fire zone may reduce environmental impact because these reactive materials are not generally persistent in the environment.

Examples of environments where flows of oxidizer and fuel and a source of ignition are present include ventilation ducts, aircraft engine nacelles, ventilated electronic cabinets, pressurized aircraft cabins, telecommunication or electrical power switching stations, fume hoods, natural gas pipelines, chemical distribution cabinets, chimneys, petrochemical refineries, and the like. These fire zones are characterized by one or more openings that allow flow of oxidizer and fuel into and out of the zone and that have flame holding regions within that may support a fire.

A computational fluid dynamic simulation of the fire zone using finite element methods may be useful in designing a fire suppression system. A representative result of such a calculation is shown in FIG. 1 for a generic fire zone. Oxidizer (air) enters at 2 and follows a plurality of natural flow paths 6, 7 and 8 through the zone. The local velocity vectors are indicated by arrows and three representative natural flow paths are illustrated by the streamlines 6, 7, and 8 in FIG. 1. Streamline 6 was identified by integrating the velocity field backward and forward in time from the flame holding region 4, so that agent injected upstream of the flame holder and onto this flow path is effectively conveyed to the flame holding region. Reactive suppressant injected along streamline 7 propagates around the flame holding region and would therefore be less effective at extinguishing the fire. Reactive suppressant injection into the flow path defined by streamline 8 does not penetrate the flame holding region either, and it recirculates within the fire zone. Injection of the suppressing agent onto the natural flow path defined by streamline 7 therefore increases the concentration of fire suppression agent in flame holding region 4 above the level of concentration what would result from flooding region 1 with the fire suppression agent.

The selection of a reactive fire suppression agent, that produces catalytic flame suppressing species when exposed to the nacelle environment is important. Phosphorous tribromide ($PBr_3$), a labile bromine fire suppressant described in U.S. Pat. No. 5,626,786, incorporated herein by reference, is a preferred agent because it rapidly produces Br atoms by pyrolysis and HBr by reaction with flame hydrogen atoms and hydrolysis when released into the flame environment, and further because it has a very short (<1 second) tropospheric lifetime and therefore lacks both stratospheric ozone depletion and global warming potentials.

The labile bromine ($PBr_3$) agent is a dense liquid. Propulsion of the agent into the fire zone may preferably be accomplished using a non-flammable pressurized gas ($N_2$) or other propellant that is partially soluble in the liquid. The solubility of the propellant gas in the liquid also results in depression of the latter's freezing point and therefore lowers the minimum operational temperature of the suppression system. In the specific case of aviation fire suppression a requirement for operation to −65° C. would normally preclude use of $PBr_3$, whose atmospheric pressure freezing point is −45° C. According to Henry's law the solubility of a gas in the liquid agent at a given temperature is proportional to the partial pressure of the gas. In other words, the mole fraction of gas that is dissolved increases with the gas pressure. The extent to which the gas is soluble in a liquid varies with the gas and liquid chemical composition and also with the solution temperature; this relationship is quantified by the Henry's law coefficient, which is well known to those practiced in the art of physical chemistry. The depression of freezing or melting points by dissolution of one material in another is a well known colligative property of solutions. In a preferred embodiment, the pressure of the gaseous nitrogen is selected to provide depression of the freezing point to less than −65° C. and to provide adequate pressure to propel the liquid agent from its vessel over the full temperature range required by the aircraft's flight envelope. A pressure of about 1.7 MPa (250 pounds per square inch) has been found to meet these criteria; different gas and liquid agent combinations may be used and will have operational pressure and temperature ranges that are calculable based on the corresponding Henry's law coefficients and the colligative properties of the solutions as described above.

Depression of the agent freezing point by dissolution of pressurized gas is extremely useful for other applications where the suppression agent may undergo a phase transition that would otherwise substantially complicate its delivery. For example, without the freezing point depression one would either have to heat the $PBr_3$ vessel to prevent solidification of the agent, or one would need to choose a less efficient agent. Either of these options would increase the weight of both the suppressant and the manifolds, valves, and tubing needed to protect the engine nacelle from fire. Fire suppression in partially enclosed spaces found in arctic, submarine, high altitude, and other cold environments may also benefit from freezing point depression as described above.

The suppression agent may be contained in a vessel until a fire is detected in the fire zone. In order to deliver the suppression agent into the fire zone, a propellant may be used as a means to change the momentum of the agent to transport it from the vessel to the fire zone. Once the fire suppressant agent is within the fire zone, the natural flows of oxidizer and fuel may be primarily responsible for agent transport. Useful propellants may be mechanical, as in a spring-driven piston; electromechanical, as in a syringe driven by a solenoid, or peristaltic pump; chemical, as in a deflagrating solid gas-generating composition; or physical, as in the expansion of a pressurized, non-flammable gas or the venturi action of the natural flow.

Materials that contain chlorine, bromine, or iodine have the potential to deplete stratospheric ozone if they persist long enough in the troposphere that they are transported to the stratosphere, where ultraviolet solar radiation may release the free Cl, Br, or I atoms and catalyze the conversion of ozone ($O_3$) to molecular oxygen ($O_2$). The Ozone Depletion Potential (ODP) is the ratio of the impact on ozone of a chemical compared to the impact of a similar mass of $CFCl_3$ (also known as CFC-11). Thus, the ODP of $CFCl_3$ is defined to be 1.0. Other chlorofluorocarbons and hydrochlorofluorocarbons have ODPs that range from 0.01 to 1.0. The halons have ODPs ranging up to 10. Carbon tetrachloride has an ODP of 1.2, and methyl chloroform's ODP is 0.11. HFCs have zero ODP because they do not contain chlorine. The ODP of a material is subject to some uncertainty because numerical values for atmospheric lifetimes, chemical reaction rates, photolytic yields, and the like are not known with perfect precision. The values presented in Table I are therefore ODP ranges that are based on consensus within the scientific community as codified in the Montreal Protocol on Substances that Deplete the Ozone Layer, signed by most nations in 1987 and substantially modified in 1990 and 1992.

Similarly, the global warming potential (GWP) is an index, created in the Kyoto Protocol to the United Nations Framework Convention on Climate Change, that allows for equal comparison of the various greenhouse gases. It is the radiative forcing that results from the addition of 1 kilogram of a gas to the atmosphere compared to equal mass of carbon dioxide. Over 100 years, methane has a GWP of 21 and nitrous oxide of 310. Both the ODP and the GWP are sensitive to a material's atmospheric lifetime and both are defined according to international treaties. The environmental impact of GWP also involves the optical properties of the material, in particular its ability to absorb and emit infrared radiation.

Table I is a list of ozone depleting substances with current estimates of their ozone depletion potential from the U.S. Environmental Protection Agency. Ranges are reported for some of these quantities and reflect uncertainty in the atmospheric lifetimes, ultraviolet photophysics, and reactive kinetics of the compounds. The table also presents atmospheric lifetimes and global warming potential as set forth in the Clean Air Act.

TABLE I

A partial list of ozone depleting compounds identified by the U.S. Environmental Protection Agency, including current estimates of their atmospheric lifetimes, ozone depletion potentials, and global warming potentials (GWP).

| Chemical Name | Lifetime, in years | ODP1 (WMO 2002[1]) | ODP2 (Montreal Protocol) | ODP3 (40 CFR) | GWP1 (WMO 2002) | GWP2 (SAR) | GWP3 (TAR) | GWP4 (40 CFR) | CAS Number |
|---|---|---|---|---|---|---|---|---|---|
| Group I (from section 602 of the CAA) | | | | | | | | | |
| CFC-11 (CCl3F) Trichlorofluoromethane | 45 | 1.0 | 1.0 | 1.0 | 4680 | 3800 | 4600 | 4000 | 75-69-4 |
| CFC-12 (CCl2F2) Dichlorodifluoromethane | 100 | 1.0 | 1.0 | 1.0 | 10720 | 8100 | 10600 | 8500 | 75-71-8 |
| CFC-113 (C2F3Cl3) 1,1,2-Trichlorotrifluoroethane | 85 | 1.0 | 0.8 | 1.0 | 6030 | 4800 | 6000 | 5000 | 76-13-1 |
| CFC-114 (C2F4Cl2) Dichlorotetrafluoroethane | 300 | 0.94 | 1.0 | 1.0 | 9880 | | 9800 | 9300 | 76-14-2 |
| CFC-115 (C2F5Cl) Monochloropentafluoroethane | 1700 | 0.44 | 0.6 | 0.6 | 7250 | | 7200 | 9300 | 76-15-3 |
| Group II (from section 602 of the CAA) | | | | | | | | | |
| Halon 1211 (CF2ClBr) Bromochlorodifluoromethane | 16 | 6.0 | 3.0 | 3.0 | 1860 | | 1300 | | 353-59-3 |
| Halon 1301 (CF3Br) Bromotrifluoromethane | 65 | 12 | 10.0 | 10.0 | 7030 | | 6900 | | 75-63-8 |
| Halon 2402 (C2F4Br2) Dibromotetrafluoroethane | 20 | <8.6 | 6.0 | 6.0 | 1620 | | | | 124-73-2 |
| Group III (from section 602 of the CAA) | | | | | | | | | |
| CFC-13 (CF3Cl) Chlorotrifluoromethane | 640 | 1.0 | 1.0 | 1.0 | 14190 | | 14000 | 11700 | 75-72-9 |
| CFC-111 (C2FCl5) Pentachlorofluoroethane | | 1.0 | 1.0 | 1.0 | | | | | 354-56-3 |
| CFC-112 (C2F2Cl4) Tetrachlorodifluoroethane | | 1.0 | 1.0 | 1.0 | | | | | 76-12-0 |
| CFC-211 (C3FCl7) Heptachlorofluoropropane | | 1.0 | 1.0 | 1.0 | | | | | 422-78-6 |
| CFC-212 (C3F2Cl6) Hexachlorodifluoropropane | | 1.0 | 1.0 | 1.0 | | | | | 3182-26-1 |
| CFC-213 (C3F3Cl5) Pentachlorotrifluoropropane | | 1.0 | 1.0 | 1.0 | | | | | 2354-06-5 |
| CFC-214 (C3F4Cl4) Tetrachlorotetrafluoropropane | | 1.0 | 1.0 | 1.0 | | | | | 29255-31-0 |
| CFC-215 (C3F5Cl3) Trichloropentafluoropropane | | 1.0 | 1.0 | 1.0 | | | | | 4259-43-2 |
| CFC-216 (C3F6Cl2) Dichlorohexafluoropropane | | 1.0 | 1.0 | 1.0 | | | | | 661-97-2 |
| CFC-217 (C3F7Cl) Chloroheptafluoropropane | | 1.0 | 1.0 | 1.0 | | | | | 422-86-6 |
| Group IV (from section 602 of the CAA) | | | | | | | | | |
| CCl4 Carbon tetrachloride | 26 | 0.73 | 1.1 | 1.1 | 1380 | 1400 | 1800 | 1400 | 56-23-5 |
| Group V (from section 602 of the CAA) | | | | | | | | | |
| Methyl Chloroform (C2H3Cl3 1,1,1-trichloroethane | 5.0 | 0.12 | 0.1 | 0.1 | 144 | | 140 | 110 | 71-55-6 |

TABLE I-continued

A partial list of ozone depleting compounds identified by the U.S. Environmental Protection Agency, including current estimates of their atmospheric lifetimes, ozone depletion potentials, and global warming potentials (GWP).

| Chemical Name | Lifetime, in years | ODP1 (WMO 2002[1]) | ODP2 (Montreal Protocol) | ODP3 (40 CFR) | GWP1 (WMO 2002) | GWP2 (SAR) | GWP3 (TAR) | GWP4 (40 CFR) | CAS Number |
|---|---|---|---|---|---|---|---|---|---|
| Group VI (listed in the Accelerated Phaseout Final Rule) | | | | | | | | | |
| Methyl Bromide (CH3Br) | 0.7 | 0.38 | 0.6 | | 5 | | 5 | | 74-83-9 |
| Group VII (listed in the Accelerated Phaseout Final Rule) | | | | | | | | | |
| CHFBr2 | | 1.0 | 1.0 | | | | | | |
| HBFC—12B1 (CHF2Br) | | 0.74 | 0.74 | | | | | | |
| CH2FBr | | 0.73 | 0.73 | | | | | | |
| C2HFBr4 | | 0.3-0.8 | 0.3-0.8 | | | | | | |
| C2HF2Br3 | | 0.5-1.8 | 0.5-1.8 | | | | | | |
| C2HF3Br2 | | 0.4-1.6 | 0.4-1.6 | | | | | | |
| C2HF4Br | | 0.7-1.2 | 0.7-1.2 | | | | | | |
| C2H2FBr3 | | 0.1-1.1 | 0.1-1.1 | | | | | | |
| C2H2F2Br2 | | 0.2-1.5 | 0.2-1.5 | | | | | | |
| C2H2F3Br | | 0.7-1.6 | 0.7-1.6 | | | | | | |
| C2H3FBr2 | | 0.1-1.7 | 0.1-1.7 | | | | | | |
| C2H3F2Br | | 0.2-1.1 | 0.2-1.1 | | | | | | |
| C2H4FBr | | 0.07-0.1 | 0.07-0.1 | | | | | | |
| C3HFBr6 | | 0.3-1.5 | 0.3-1.5 | | | | | | |
| C3HF2Br5 | | 0.2-1.9 | 0.2-1.9 | | | | | | |
| C3HF3Br4 | | 0.3-1.8 | 0.3-1.8 | | | | | | |
| C3HF4Br3 | | 0.5-2.2 | 0.5-2.2 | | | | | | |
| C3HF5Br2 | | 0.9-2.0 | 0.9-2.0 | | | | | | |
| C3HF6Br | | 0.7-3.3 | 0.7-3.3 | | | | | | |
| C3H2FBr5 | | 0.1-1.9 | 0.1-1.9 | | | | | | |
| C3H2F2Br4 | | 0.2-2.1 | 0.2-2.1 | | | | | | |
| C3H2F3Br3 | | 0.2-5.6 | 0.2-5.6 | | | | | | |
| C3H2F4Br2 | | 0.3-7.5 | 0.3-7.5 | | | | | | |
| C3H2F5Br | | 0.9-1.4 | 0.9-1.4 | | | | | | |
| C3H3FBr4 | | 0.08-1.9 | 0.08-1.9 | | | | | | |
| C3H3F2Br3 | | 0.1-3.1 | 0.1-3.1 | | | | | | |
| C3H3F3Br2 | | 0.1-2.5 | 0.1-2.5 | | | | | | |
| C3H3F4Br | | 0.3-4.4 | 0.3-4.4 | | | | | | |
| C3H4FBr3 | | 0.03-0.3 | 0.03-0.3 | | | | | | |
| C3H4F2Br2 | | 0.1-1.0 | 0.1-1.0 | | | | | | |
| C3H4F3Br | | 0.07-0.8 | 0.07-0.8 | | | | | | |
| C3H5FBr2 | | 0.04-0.4 | 0.04-0.4 | | | | | | |
| C3H5F2Br | | 0.07-0.8 | 0.07-0.8 | | | | | | |
| C3H6FBr | | 0.02-0.7 | 0.02-0.7 | | | | | | |
| Group VIII (from the Chlorobromomethane Phaseout Final Rule) | | | | | | | | | |
| CH2BrCl Chlorobromomethane | 0.37 | | 0.12 | 0.12 | | | | | |

[1]The Scientific Assessment of Ozone Depletion, 2002 updated a limited number of GWPs and ODPs (semiempirical values for all updated ODPs except CFC-114 and CFC-115, which are model-derived). All GWPs and ODPs that were not updated in 2002 are 1998 values that have not changed.

As may be understood from the definition of ozone depletion potential, the ozone depletion potential of a mixture such as of a propellant and a suppressing agent, will be a mass-weighted average of the ozone depletion potentials of its constituents. Similarly, the global warming potential of a mixture is a mass-weighted average of the global warming potentials of its constituents.

Referring now to FIGS. 6, 7 and 8, a preferred embodiment is disclosed for use in suppressing fires in the nacelle of a jet aircraft engine. The engine nacelle is the volume that is bounded by the external surface of the engine core shown in FIG. 6 and an aerodynamic skin shown in FIG. 7. The fire zone in a typical nacelle, shown in FIG. 8, is ventilated by two inlets 82 that extract airflow from the slipstream of the aircraft and two outlets 83 whose primary function is to provide cooling of the internal components. Within the nacelle volume, various fittings, hoses, cables, and structures protrude, and these may generate flame holding regions as described above. An example of such a flame holding region under typical flight conditions is the space 86 aft of the accessory gear box 63.

Figure 9:
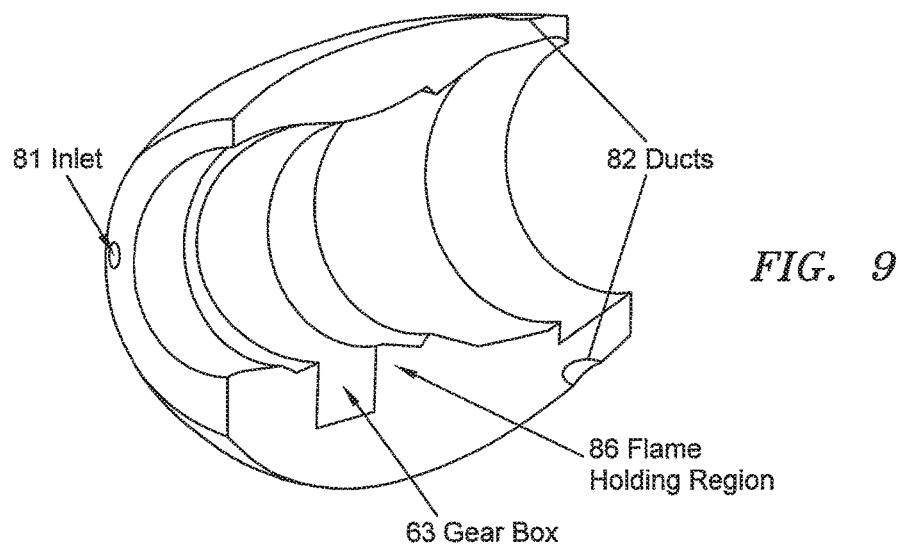
FIG. 9 is a cutaway view of a jet engine nacelle illustrating the velocity field from an exemplar computational fluid dynamics calculation of air flow through the nacelle.

Referring now to FIG. 9, natural flow paths through a fire zone may be found using computational fluid dynamic calculations as described above. A result of a typical calculation for an inlet airspeed of 150 meters per second shown in the cutaway view of FIG. 9, where one of the inlets 81, the exhausts 82, and the flame holding region 86 aft of the accessory gear box 63 correspond to the same locations shown in FIGS. 6 and 8. Arrows indicate the direction and, by their length, the relative velocity of air flowing in and through the nacelle.

Figure 10:
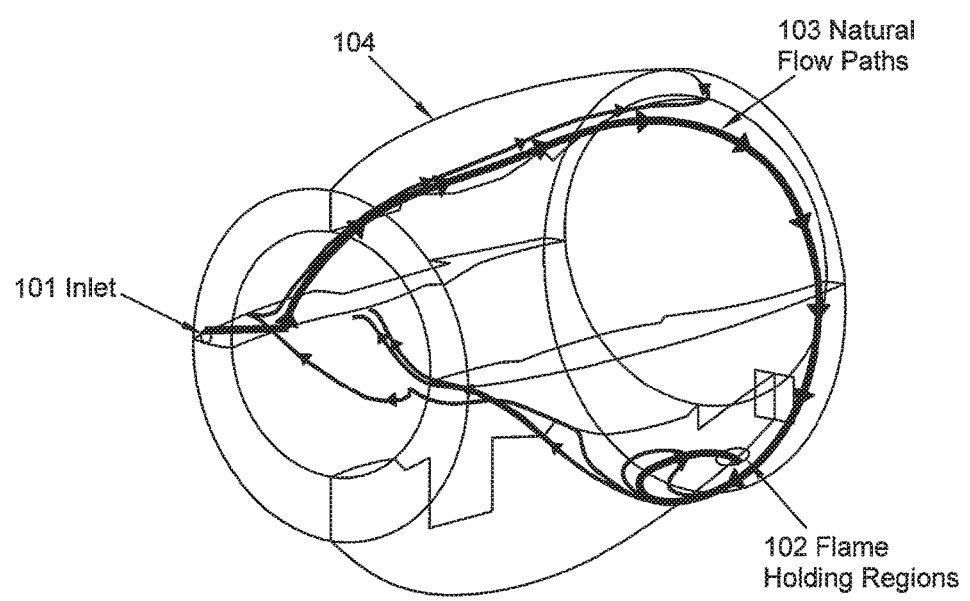
FIG. 10 is a perspective view of a jet engine nacelle illustrating exemplar streamlines that illustrate a natural flow path through the nacelle.

Referring now to FIG. 10, natural flow paths through this fire zone may be computed by integrating initial coordinates over the velocity field. An example of 5 such paths 103 that begin near the inlet 101, and continue across the vertical midplane before exiting through the lower exhaust next to flame holding region 102, is shown in FIG. 10.

It may be advantageous to systematically identify all of the flame holding regions including flame holding region 102. Streamlines from these regions may then be integrated backwards in time to identify injection points at which suppressing agent would be transported efficiently to the flame holding regions. Various features of the flow field calculations such as turbulence at the inlets, the interaction of the aircraft slip stream with the inlets and exhausts, influence of flight condition, compressibility of airflows, and so forth are familiar to those practiced in the art of fluid flow and aerodynamics and are described in standard treatises such as Computational Fluid Mechanics and Heat Transfer by John Tannehill, Dale Anderson, and Richard Pletcher (Philadelphia: Taylor and Francis) 1997 (ISBN 1-56032-046-X) or Physical Fluid Dynamics by D. J. Tritton (Oxford: Clarendon Press) 1988 (ISBN 0 19 854493 6).

Figure 11A:
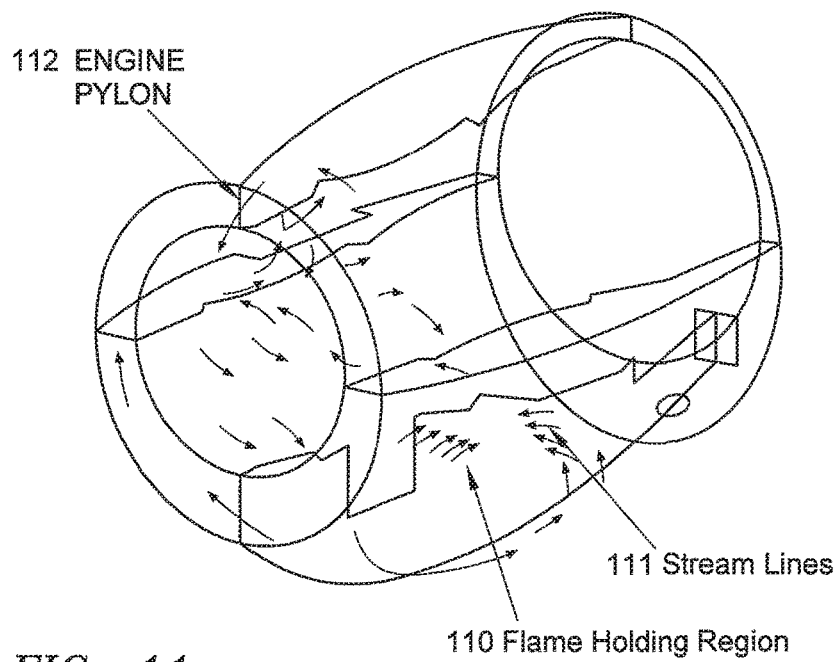
FIGS. 11a and 11b show perspective and overhead views of streamlines that are propagated backward from a flame holding region to an injector location.
Figure 11B:
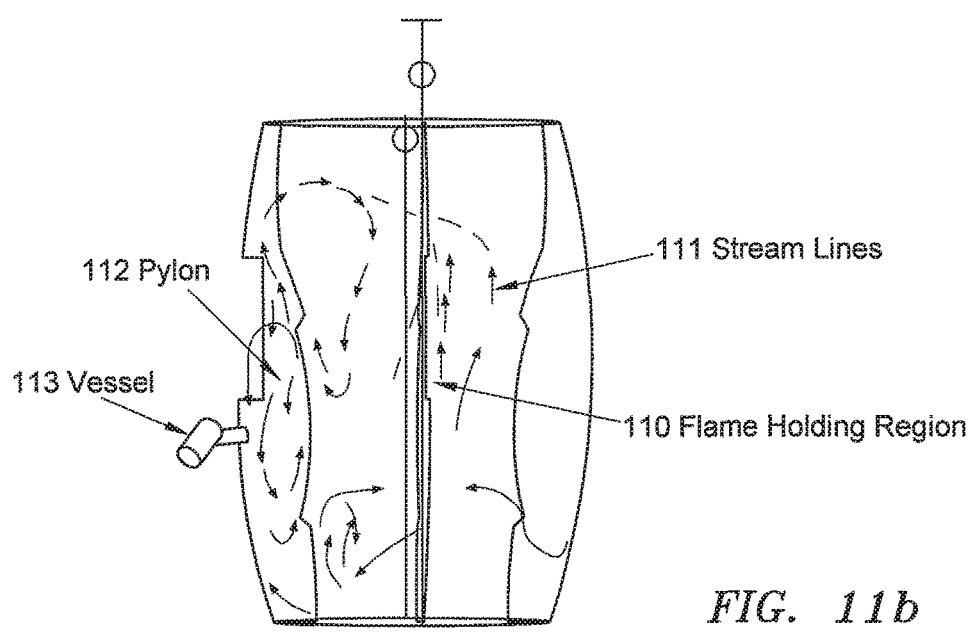

Referring now to FIGS. 11a and 11b, two views of five natural paths to the flame holding region 110, along with streamlines 111 that are integrated backward to a region near the engine pylon 112 from which an injected fire suppression agent would be transported to the fire. This procedure may be repeated for each flame holder within the fire zone, and one or more injection points for agent may be identified. In this particular fire zone a location for the vessel 113 containing the fire suppressant proximate to the pylori mounting area was found useful to inject and transmit suppressant by natural flow paths to all flame holding regions within the fire zone.

Visualization according to an alternative and complementary aspect may be accomplished by taping yarn to the inner surfaces of an actual engine and then photographing the orientation of the yarn at various inlet flow conditions. Visualization of smoke produced by fires in an actual nacelle fixture may also be used to confirm identification of the natural flow paths in the fire zone.

An analysis of natural flow paths and flame holders permits optimization of the number and location of agent injection points to ensure delivery of suppressant to all flame holding regions from a minimal number of injection points. For example, in the case of a particular engine nacelle, a single point near 112 has been shown by analysis and verified by experiment to be adequate to suppress all fires within the nacelle.

Figure 12:
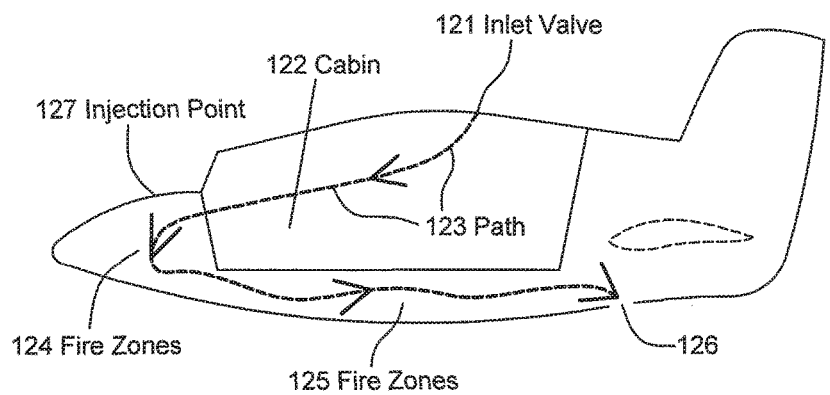
FIG. 12 is a sectional side view of an aircraft cabin illustrating a natural flow path through the pressurized zone and the locations of fire or smoke detectors and suppressing agent injectors that are linked to flame holding regions.

Referring now to FIG. 12, suppression of fires in a typical pressurized aircraft cabin is shown. Engine compressor bleed air is filtered and humidified before entering through a valve 121 into the occupied area of the cabin 122. One natural flow follows a path 123 from the occupied area through the avionics and battery compartment 124, into the electrical chase 125 that is under the cabin floor, and finally through a pressure control valve 126 that is vented to the outside air. Fire suppression in fire zones 123 and 124 use the natural flow to transport agent, from an injection or agent discharge point such as indicated by 127, to each of the flame holding regions, obviating a requirement to flood the entire cabin with an extinguishing agent, which may be hazardous to human occupants. The geometry and flame holding regions vary with the detailed design of the aircraft cabin, so that a plurality of injectors may be required. Use of the natural flow paths to distribute agent into flame holding region improves suppression effectiveness and reduces the size and mass of the suppression system.

Figure 13:
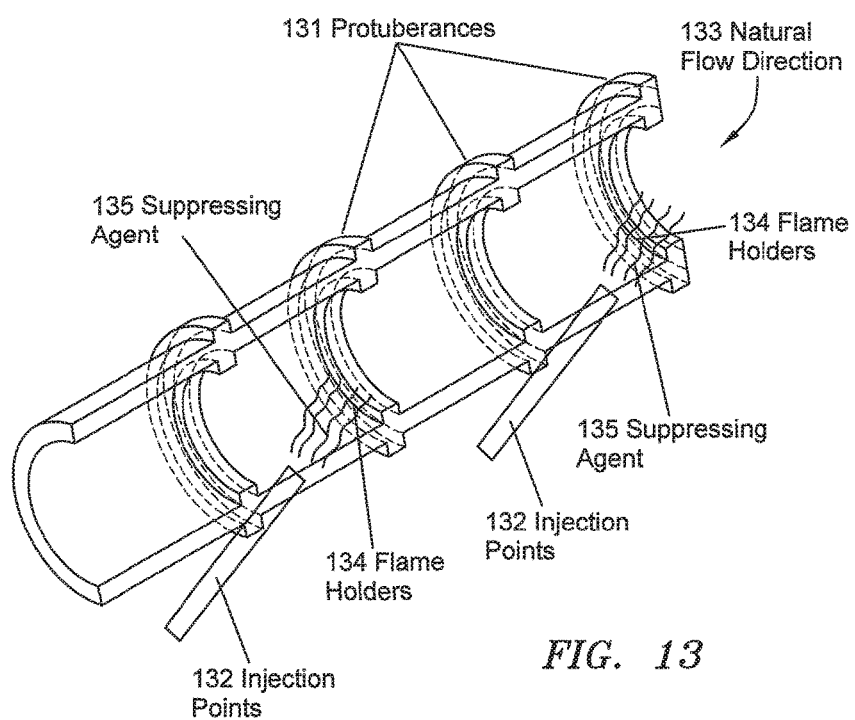
FIG. 13 is a sectional side view of a duct illustrating a plurality of injectors positioned such that the suppressing agent exiting each injector is directed towards a natural flow path flowing towards a flame holding region.

Referring now to FIG. 13, techniques for suppressing fires in a duct are shown. Natural flows within the duct may be driven by an external blower at its entrance, its exit, internally, or at a combination thereof. Natural flows in the general direction indicated by 133 through a duct are influenced by protuberances such as flanges 131, screws, bends, unions, tees, and the like. The space downstream of these protuberances may act as flame holders 134 if a source of fuel is present in the duct. This fuel may take the form of congealed grease in the duct over a cooking stove, flammable vapors in the duct that ventilates a storage cabinet, pyrophoric gases from a leak in a semiconductor fabrication facility, combustible materials in ducts of a petrochemical refinery, and the like. Suppressing agent 135 may be admitted or injected into the natural flows through orifices 132 in the opposite direction of the main flow 133 and aimed directly toward the flame holding regions 134. This counterflow injection uses momentum transfer from the natural flow to the agent stream to slow the agent down and increase its residence time in the vicinity of the flame holder regions 134.

The flow field within the duct and each potential flame holding region may be calculated, measured and identified on the basis of air recirculation and availability of fuel. With reference to FIGS. 1 and 2, one expects recirculation that is downstream of protuberances to be likely flame holding regions within the duct. FIG. 13 shows injection points 132 and directions that exploit the natural flows to ensure that agent penetrates the flame holding regions and maintains a suppressing concentration for the maximum possible time. Specifically, direction of the agent against the main flow downstream of each protuberance causes momentary reversal of the recirculation zones as well as deceleration and reacceleration of the agent by the natural flows within the duct.

Figure 14:
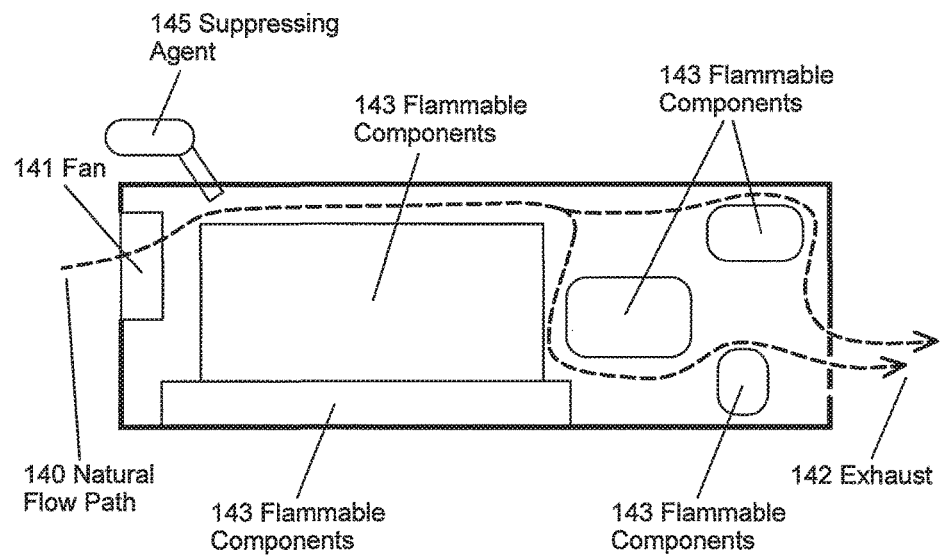
FIG. 14 is a sectional side view of a computer cabinet illustrating an injector positioned such that the suppressing agent exiting the injector is directed towards a natural flow path flowing towards a plurality of flame holding regions.

Referring now to FIG. 14, fires in a ventilated cabinet may also be suppressed using injection along natural flow paths. Such a cabinet may be for storage of flammable materials, but it may also be a cabinet that houses electrical or electronic components such as computer servers, telecommunications switches, and the like. These configurations are disclosed schematically in FIG. 14 and may differ from the nacelle example in the details of the flow, ignition, and fuel conditions. In this figure, air is propelled by a fan 141 along natural flow paths such as 140 around various circuit boards, transformers, and other potentially flammable components 143 before emerging from the cabinet through a plurality of exhaust apertures 142. Active ventilation to prevent accumulation of flammable fumes and also to cool electrical components leads to natural flows within the cabinet that are driven by thermal convection, advection, and diffusion. As will be clear from the preceding discussion, analysis of flame holding regions and natural flow paths may be accomplished with a combination of computational and experimental fluid dynamics. Flame holding regions proximate to a source of combustible material such as plastic insulation, pooled liquid fuel, flammable vapors, and the like may be identified, then natural flows that transport suppressing agent to these regions may be used to identify injection points for suppressing agent 145 and conditions.

Figure 15:
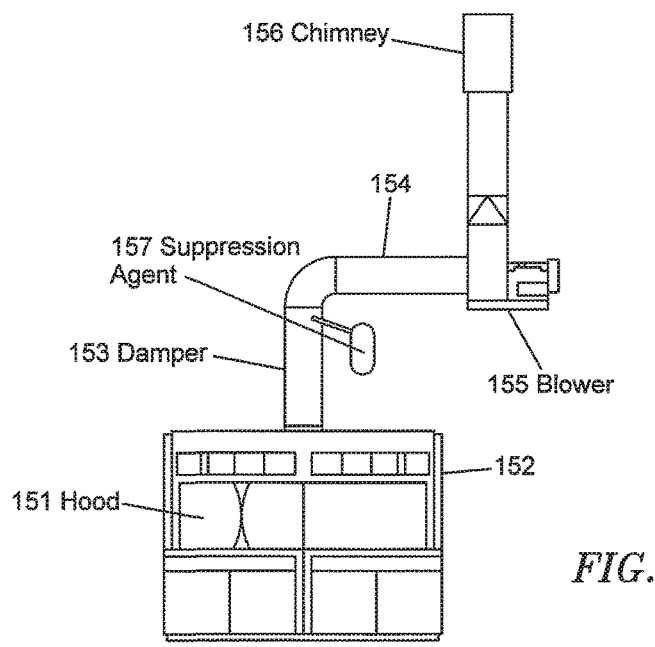
FIG. 15 is a sectional side view of an exhaust hood illustrating a plurality of injectors positioned such that the suppressing agent exiting each injector is directed towards a natural flow path flowing towards a flame holding region.

Referring now to FIG. 15, a combination of a cabinet and a duct may be a little different from a fume hood such as is used in chemical laboratories. Natural flows over the working surface of the hood 151 through a damper 153, into ducts 154 that may bend, into a blower 155, and eventually through a chimney 156 to the atmosphere, may be used to transport suppressing agent to flame holding regions. In FIG. 15, agent injection at 157 uses the forced flow from the blower 155 to provide fire suppression to the region between the damper 153 and the chimney 156 because the natural flow of the system distributes the agent 157 according to the present invention.

Figure 16:
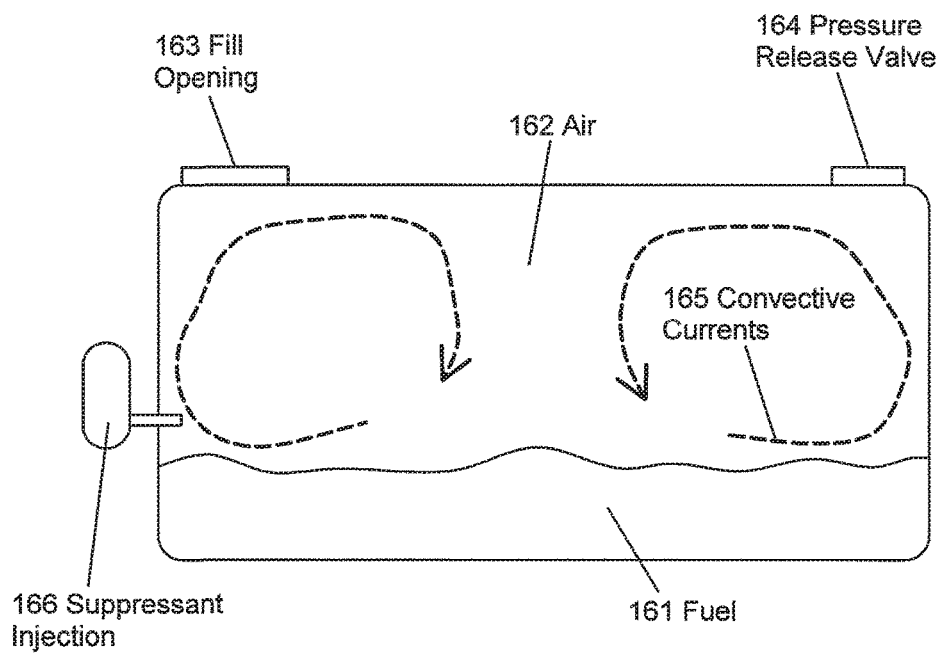
FIG. 16 is a sectional side view of a fuel tank illustrating an injector positioned such that the suppressing agent exiting the injector is directed towards a natural flow path flowing to a flame holding region.

Referring now to FIG. 16, fire suppression may also be practiced in the partially enclosed space of a fuel tank with fuel 161. The natural flow paths in a fuel tank are typically primarily convective, however a pressure release valve or vent 164 and an opening 163 through which the tank may be filled are usually present. The air over the fuel tank, sometimes called ullage 162, is saturated with fuel vapor at the liquid's temperature, so the limiting reagent for combustion is generally oxygen. If a fire is started in the fuel tank by a spark or other ignition source then heat that is generated drives convective currents 165; these flows and the flow through the pressure relief valve 164 are natural flows for the fuel tank, and injection of agent at appropriate locations such as 166 can use these natural flows to transport agent to regions where flame holding is possible.

In the configurations described above, a reactive agent that produces catalytically active species when it is introduced into the fire zone is used. After a fire is detected this agent may be propelled from a container or vessel through an injection port into the fire zone.

Figure 17:
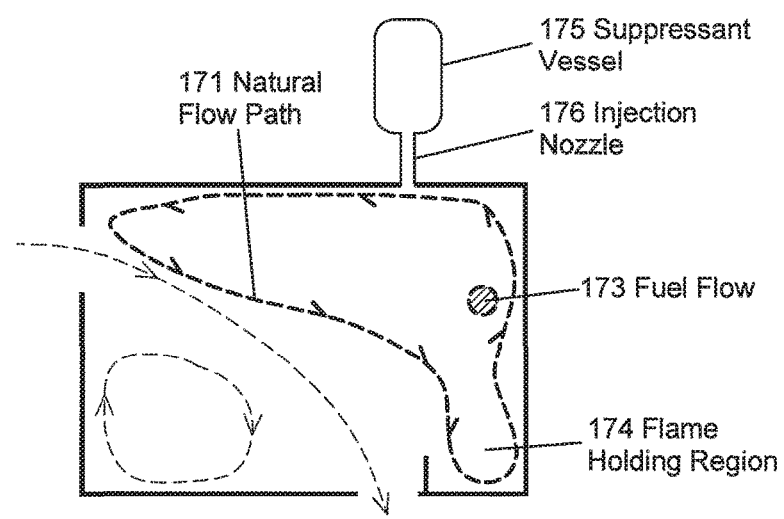
FIG. 17 is sectional side view of a partially enclosed space with a tank located outside of the partially enclosed space.

Referring now to FIG. 17, vessel 175 may be outside of the fire zone and connected to it by a tube, pipe, or flange 176. Agent is propelled into a natural flow 171 of the fire zone that delivers it to flame holding regions 174 where recirculation and fuel flow from 173 attach a flame.

Figure 18:
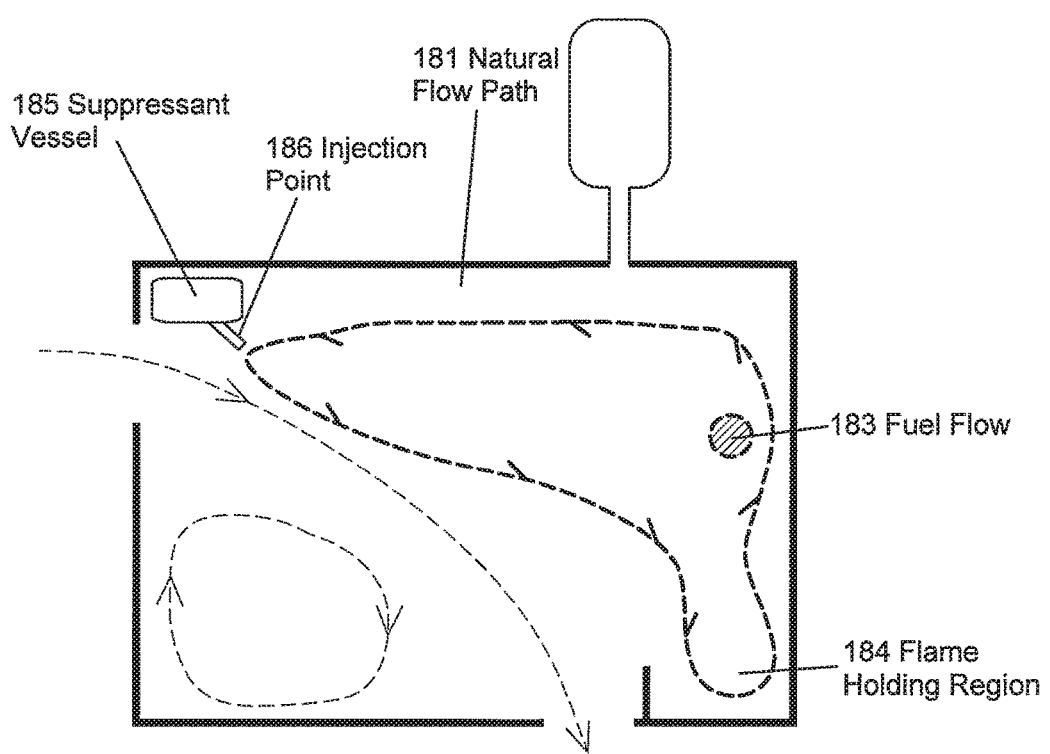
FIG. 18 is a sectional side view of a partially enclosed space with a tank located inside of the partially enclosed space.

Referring now to FIG. 18, the vessel 185 that contains the reactive agent may be housed inside the fire zone, an approach which eliminates the need for tubing, pipe, or flanges and generally results in lower weight, volume, and complexity. In this figure the agent is injected from the vessel 185 through a valve and nozzle 186 onto a natural flow path 181 that leads to a flame holding region 184 that is wetted by fuel flow from 183.

Injection of the agent into natural flow paths of the fire zone by propellants is intended to harness the natural flows to transport the agent to flame holding regions. While it may be desirable to inject as much of the available suppressing agent into these natural flow paths, constraints of geometry, nozzle design, fluid dynamics, and other design criteria, may result in not all of the suppressing agent being dispensed into the natural flow paths that lead to flame holding regions. The amount of suppressing agent that is required to be dispensed into the natural flow paths that lead to flame holding to effectively suppress the fire may depend on the suppressing agent. Preferably at least 10% by weight of the suppressing agent exiting the nozzle would be dispensed directly into the natural flow paths that transport agent to flame holding regions. It is preferable that at least 50% by weight of the suppressing agent exiting the nozzle to be dispensed directly into the natural flow paths leading to flame holding regions. Optimally, at least 75% by weight of the suppressing agent exiting the nozzle may be dispensed directly into the natural flow paths that lead to flame holding regions.

Figure 19:
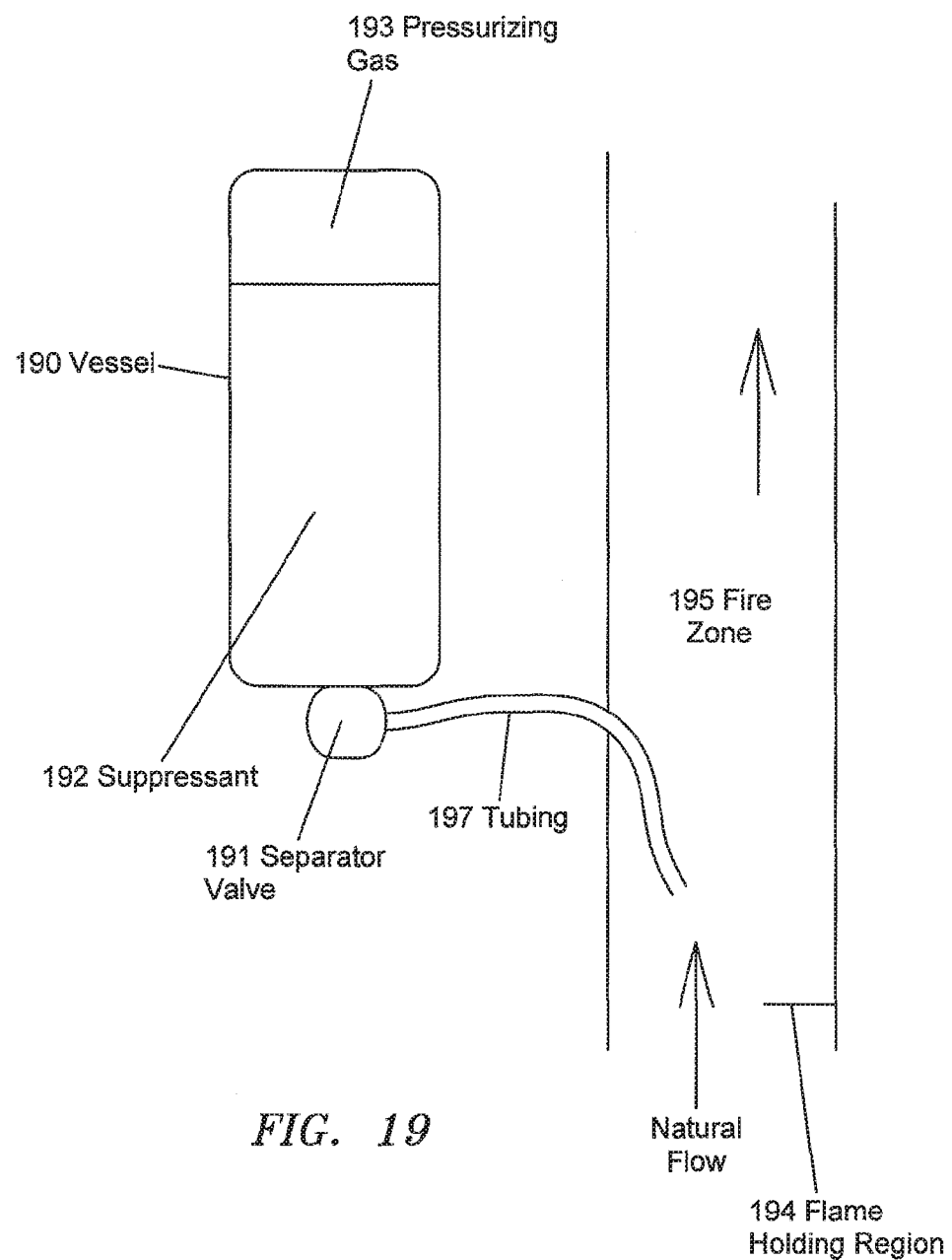
FIG. 19 is an enlarged view of an injector distributing suppressing agent into a natural flow path flowing towards a flame holding region.

Referring now to FIG. 19, vessel 190 that contains a pressurizing gas 193 and a saturated solution of the gas in the suppressant liquid 192 may be separated from the fire zone by a valve 191 and a small section of tubing 197. The natural flow in the fire zone 195 is indicated by arrows, and with reference to FIG. 2, the protuberance into the flow may lead to a flame holding region 194. The agent is shown to be propelled in the direction of the flame holder 194 and against the main flow direction. This arrangement momentarily reverses the main flow, allowing penetration of the flame holding region by the suppressant. In addition, momentum transfer from the main flow first slows, then reverses the direction of the injected material. As a result, the residence time of the agent near the flame holding region 194 may be maximized as well as the effectiveness of the fire suppression.

Figure 20:
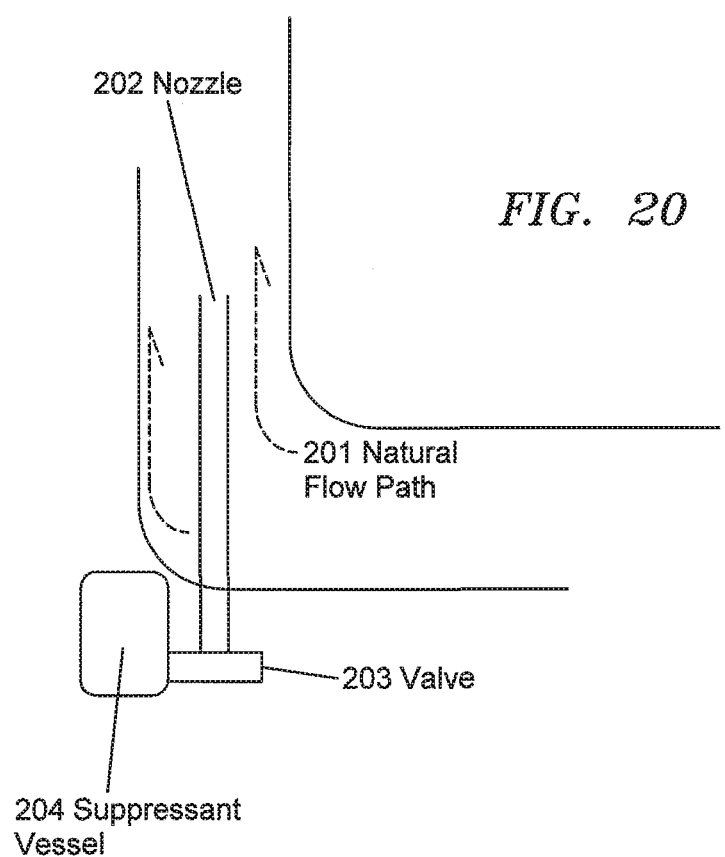
FIG. 20 is an enlarged view of a jet located in a natural flow path such that a venturi effect is created by the fluid flowing around the jet to draw suppressing agent out of the jet and into the natural flow path flowing towards a flame holding region.

Referring now to FIG. 20, the natural flow paths leading to flame holders may be used to draw suppressant from its vessel by venturi forces. Immersion of the nozzle in a strong natural flow 201 causes a pressure drop in front of the nozzle 202 that can draw agent through a valve 203 from the vessel 204 into the natural flow. This approach operates with the suppressant vessel 204 at ambient pressure and uses the venturi effect as a propellant for the reactive suppressing agent. As before, identification of flame holding regions and locations for agent injection that provide natural flow paths to these regions is desirable for practice of the invention.

Referring now to FIGS. 21 through 26, techniques are disclosed for testing fire suppression systems of the type that inject reactive transport agents, such as $PBr_3$, into flow paths to deliver catalytic suppression agents, such as HBr, to flame holding regions for fire suppression. In particular, a test agent may be selected which is transported by the flow path in generally the same way as the catalytic suppression agent is transported. The test agent may be injected at about the same injection point as the reactive transport agent would be injected. The presence of the test agent in flame holding regions may then be tested to determine if the amount of catalytic suppression agent delivered by the flow path to the flame holding region would be sufficient to suppress a fire.

In order to suppress a fire, a critical number of catalytic suppression agent molecules must be present in the volume surrounding a flame holding region for a sufficient time so that enough catalytic reactions occur to extinguish the fire by, for example, inhibiting a sufficient number of exothermic reactions to reduce the temperature of the fuel to below its combustion point. Each molecule of the catalytic suppression agent may inhibit many exothermic reactions because the molecule of catalytic agent may not be destroyed by inhibiting one or more exothermic reactions. The critical number of suppression agent molecules and the time the molecules must be present in the flame holding region in order to cause extinguishment may vary depending on combustion conditions such as the composition and flow rates of the fuel and oxidizer as well as the geometry of the flame holding region. Further, although there may be an absolute minimum amount, or critical number, of catalytic suppression molecules that must be present to inhibit a particular fire in a particular flame holding region, the time required for extinguishment may decrease as a function of the number of such molecules that are present. That is, as the amount or number of catalytic suppression molecules is increased, the minimum amount of time the catalytic suppression molecules must be present in the flame holding region to cause extinguishment decreases.

The amount of catalytic fire suppressant, and time required for extinguishment, may be expressed in many different ways. The amount of catalytic agent required may be expressed in as the number of molecules, or more conveniently, the mass of the catalytic agent. For convenience, the amount of agent is typically expressed as amount or mass of agent per unit of volume using terms such as "density" and "concentration" which may have dimensions of mass/length$^3$. The term "flux" may be used to represent the amount or mass of agent that traverses the flame holding region as a function of time and has units of mass/(length$^2$*time). Flux is equal to the product of the local density and the local velocity of the flow in units of length/time. An aperture or orifice can be used to define a specific area through which a defined flow may pass and may have units of area such as dimension length$^2$.

The mass flow rate through an orifice is the product of the flux and the area of an element, such as an aperture or orifice through which the flow passes and may have units of mass/time. The term dose may represent the integral of mass flow rate over time, or equally the integral of the flux times the area over time. Dose has units of mass and refers to the total amount of material, such as the catalytic fire suppression agent, that has traversed a defined area or volume. The dose rate may be the derivative of the dose with respect to time, or equally the product of the flux and area, or mass flow rate. Dose rate has dimensions of mass/time.

The catalytic fire suppression species that inhibits combustion does so by reducing the heat released in a flame holding region by interfering with the heat producing or exothermic chemical reactions that occur during combustion. The presence of a critical density or concentration of the catalytic suppression agent, and a critical mass flow rate or dose rate of the catalytic suppression agent is used to achieve fire suppression. The numerical values for these quantities, or their equivalents, depend in detail on the composition and flow rates of the fuel and the oxidizer as well as the geometry of the flame holding region.

In other words, although each molecule of the catalytic suppression agent may inhibit many exothermic reactions, there must be enough molecules of the catalytic suppression agent present in the flame zone for enough time to overcome or inhibit enough exothermic reactions to cause extinguishment. That is, the catalytic suppression agent must be present at a concentration or density in the volume of the flame holding region for a sufficient time to cause extinguishment. This may be described as a requirement for the presence of a critical mass of the catalytic suppression agent of a critical length of time to enable extinguishment. The ratio of the critical mass to the critical time may be called the critical dose rate.

Figure 21:
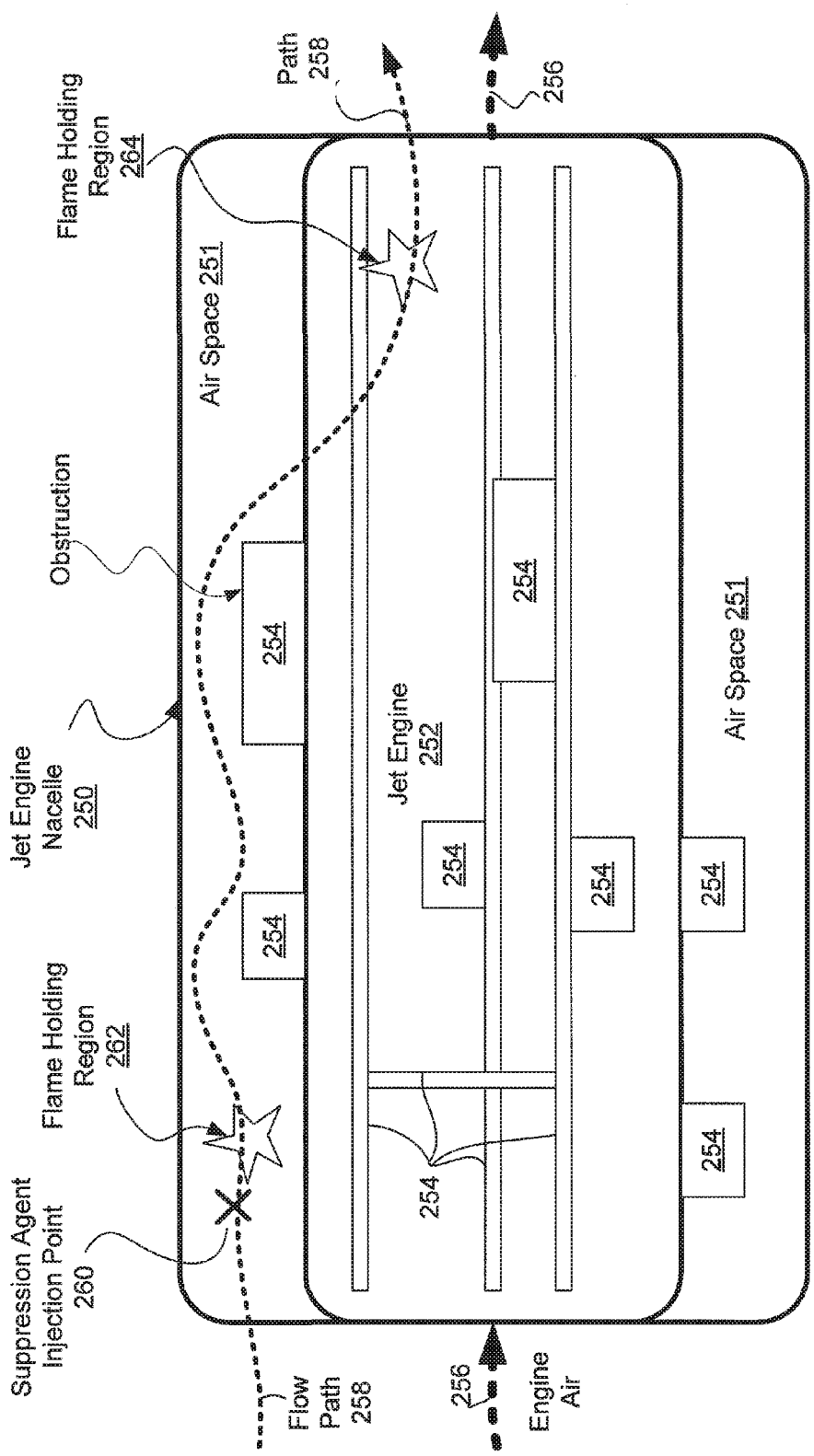
FIG. 21 is a cut away side view of a jet engine nacelle with a reactive fire suppression system.

Referring now specifically to FIG. 21, an example of fire suppression is described with regard to jet engine nacelle 250 shown in a partially cut away view. Jet engine 252 is mounted within nacelle 250 and includes various obstructions 254 on the surface thereof, such as pipes, conduits and other structures described in more detail above with regard to FIGS. 6, 7 and 8. In normal operation, a substantial stream of air, shown as engine air 256, is pulled into, combined with fuel therein and exhausted from engine 252 to produce thrust. Depending upon the jet engine and operating conditions, air stream 256 may be flowing at high speed, for example, 300 knots or nautical miles per hours. In addition, a much smaller and slower air stream may pass through the roughly cylindrical air space 251 between engine 252 and nacelle 250. One portion of this air stream, which may be flowing at 10 or 15 knots, is shown as natural flow path 258. The path of flow path 258 may obstructed in part by the various structural obstructions depicted as obstructions 254 and may therefore not be in a straight line.

A fire suppression system is useful, and may be required, to extinguish fires which occur within air space 251 during engine operation. Such fires may occur at multiple locations depending on the sources of fuel, such as jet fuel, and oxidizer, such as air in flow path 258, present within air space 251. Each such location may be considered a flame holding region in that fire or flame may be present at each such location during an engine fire. The volume of a flame holding region, such as flame holding region 262 near the intake of air space 251 or flame holding region 264 near the outlet for flow path 258, may be considered to be a generally cylindrical shape extending from the outer surface of jet engine 252 to the interior surface nacelle 250. The height of the flame holding volume surrounding flame holding region 262 is visible in the generally side view of flame holding region 262 shown in FIG. 21. The diameter of the flame holding volume surrounding flame holding region 264 is visible in the generally top view of flame holding region 264 also shown in FIG. 21.

The exact shape of volume surrounding each flame holding region is not critical, but it is helpful to know the volumes of the flame holding region in order to design and implement a fire suppression system. As described in greater detail below with regard to FIGS. 24 and 25, conventional fire suppression techniques have utilized flooding or streaming fire suppression systems. A flooding first suppression system utilized to suppress fires in jet engine nacelle 250 shown in FIG. 21 would require that the fire suppression agent be delivered to flood the entire air space 251 between engine 252 and nacelle 250. This fire suppression technique requires a large amount of fire suppression agent and a means of flooding air space 251. Although a single or even a few injection points could be used to flood air space 251, the time required to obtain the desired concentration of the fire suppression agent throughout air space 251 from a larger number of injections points would be less. Conventional fire suppression system requirements are that the chamber must remain flooded for specific length of time, e.g. 6 seconds, after total flooding is achieved. Conventional streaming fire suppression techniques typically require that a stream of fire suppression agent be applied to each flame holding region for sufficient time to extinguish the fire. This approach tends to require multiple points of injection of the fire suppressing agent and is difficult to test without requiring that the object, such as a jet engine nacelle, be actually burned to determine the effectiveness of the fire suppression. Conventional flooding and streaming fire suppression techniques may be improved by use of reactive transport agents and/or catalytic suppression agents.

As shown in FIG. 21, and described below, a reactive fire suppression system would typically require substantial less fire suppression agent and a relatively few points of injection to achieve extinguishment. In addition, a reactive fire suppression system may be tested without the need for the destructiveness of an actual fire. In particular, in order to suppress the fire represented by flame holding regions 262 and 264 along natural flow path 258, it is only necessary to transport a sufficient mass of the active species of the fire suppression agent along path 258 so that the critical mass of the molecules of the active species are available in both of the volumes surrounding flame holding regions 262 and 264 long enough to suppression the fire by catalytically inhibiting suppression enough exothermic reaction to reducing the temperature of each region below combustion temperature.

It may be appropriate to design a reactive fire suppression system so that substantially more catalytic suppression agent than the critical mass as described above in order to provide a safety factor. The total suppression agent to be delivered by a reactive fire suppression system may conveniently be expressed in terms of the increase of the mass delivered compared to the mass required for a flooding type suppression system. It is believed that an increase in mass of between 10% and 100% is appropriate for the most downwind of the flame holding regions while in increase of 50% or more preferably about 75% may be desirable.

For example, a pulse of reactive fire suppression agent such as $PBr_3$ injected at injection point 260 would almost immediately release HBr molecules at injection point 260 by reaction with moisture in the air path and/or on surfaces in air space 251. Some Br molecules may also be released by reaction due to heat especially if the injection point is adjacent a heat source such as a flame holding region. The HBr (and/or Br) molecules will be transported along flow path 258 into the volume surrounding flame holding region 262. The pulse of PBr$_3$ injected at point 260 must be long enough, at a particular mass flow rate, so that during transport along flow path 258 at least a critical mass of HBr (and/or Br) molecules, that is, a sufficient number of molecules to catalytically inhibit sufficient exothermic reactions in the volume surrounding flame holding region 262 to reduce the temperature below the point of combustion, are present in the volume surrounding flame holding region 262 for a critical time, that is, a sufficient length of time to accomplish the desired catalytic inhibition of exothermic reactions, to cause extinguishment of any fire within flame holding region 262.

However, flame holding region 264 is substantially downwind, that is, further along flow path 258 so that the catalytic suppression agent molecules delivered to flame holding region 264 will arrive at a later time and at a lower concentration or density. The duration of the pulse of PBr$^3$ injected at point 260 may have to be lengthened beyond what is required for suppression in flame holding region 262 in order to have a critical mass of catalytic molecules delivered to the volume surrounding flame holding region 264 for the critical time sufficient to extinguish the fire in that flame holding region. It is important to note that a single pulse of fire suppression agent applied to a single injection point may result in the extinguishment of one or more fires in multiple flame holding regions using a reactive fire suppression system thereby requiring substantially less volume and complexity than required by conventional flooding or streaming technology. It is also important to note that reactive fire suppression agents such as PBr$^3$ can be successfully used with streaming or flooding technology as well as reactive fire suppression technology as shown below with regard to FIGS. 24 and 25. In specific situations, it may be desirable to utilize some combination of reactive, flooding and streaming fire suppression technology with reactive fire suppression agents.

It also may be desirable to test the effectiveness of the transport of reactive fire suppressant agents, in a manner similar to conventional testing of flooding agents, to determine concentration and time related values without resort to the destructiveness inherent in testing by extinguishing actual fires. As discussed below in greater detail with respect to FIGS. 22 through 26, testing of the transport of reactive fire suppression agents, such as PBr$_3$, may be accomplished by injecting molecules of another material, such as Kr, having the same transport characteristics as the primary active molecule of the agent, i.e. HBr.

Figure 22:
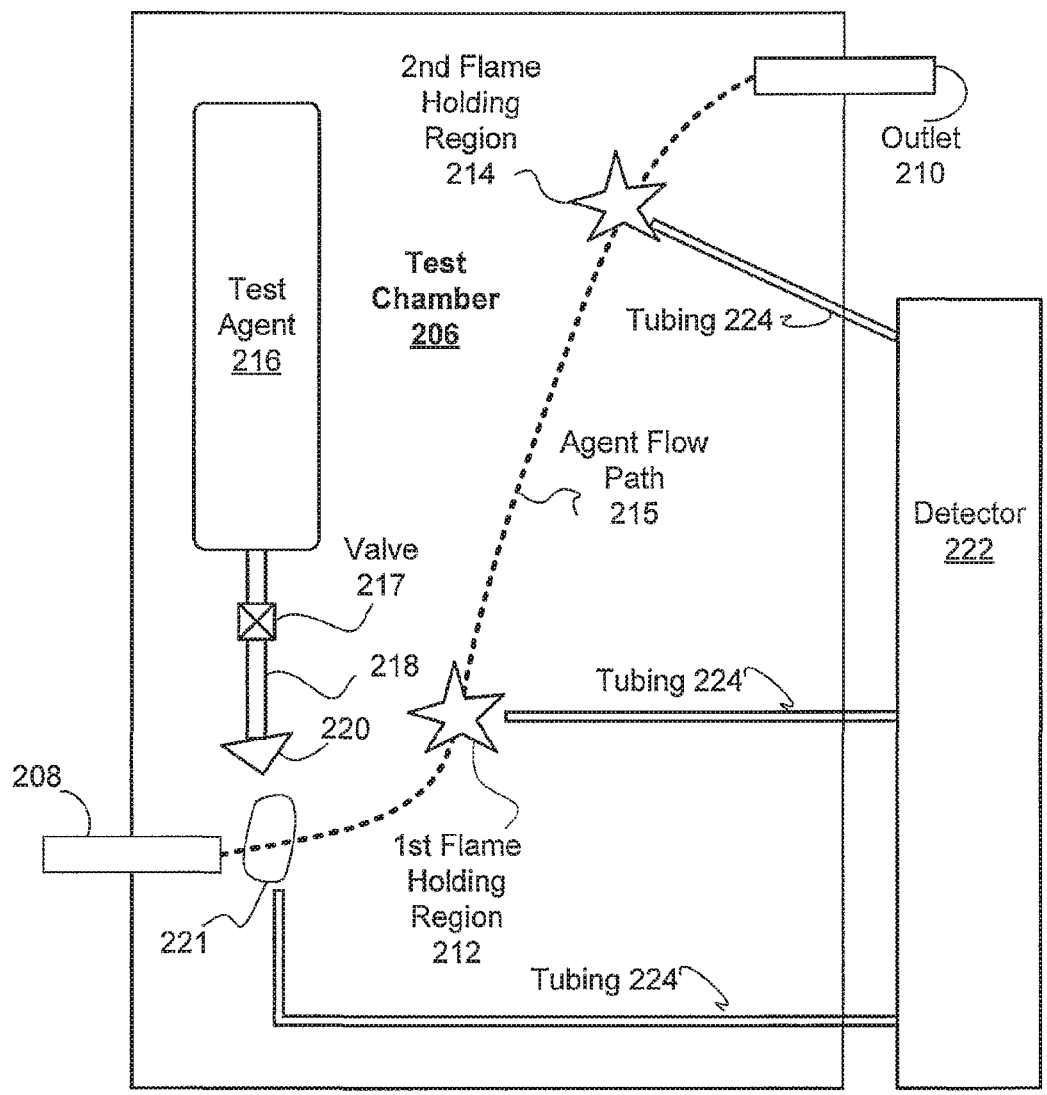
FIG. 22 is a block diagram of a fire suppression technique for use with reactive fire suppression agents under test with a non-reactive test agent.

Referring now to FIG. 22, test chamber 206 includes chamber inlet 208, chamber outlet 210 and 1$^{st}$ and 2$^{nd}$ flame holding regions 212 and 214 as a representative one of many different configurations of structures in which reactive flame suppression agents may be used. Agent flow path 215 is the natural flow path, selected for use with a reactive flame suppressant provided via valve 217 via pipe and/or tubing 218 and/or nozzle 220, to extinguish fires occurring at flame holding regions 212 and 214. In order to test the effective distribution, or transport, of a reactive flame suppression agent disbursed into path 215 via nozzle 220, test agent 216 is provided to pipe 218 via valve 217. Valve 217 is a valve with a powered operator, such as an electrically or hydraulically operated valve, that can be operated in a pulsed fashion to deliver test suppression agent 216 from a tank over a predetermined duration of time.

Reactive flame suppression agents operate by reacting chemically with the environment of the fire, particularly surrounding flame holding regions 212 and 214, to produce catalytically potent fire suppressant materials. For example, a reactive fire suppression agent such as PBr$_3$, used in test chamber 206, would react with moisture in the air, and on surfaces within the chamber, to produce HBr gas as the active species that would catalytically disrupt flame chemistry at flame holding regions 212 and 214 to suppress the fire. The fire would be completely suppressed if the HBr gas is present at the flame holding regions with a sufficient density for a sufficient duration of time. The reactive agent PBr$_3$ reacts very rapidly with moisture on surfaces or in ambient air to produce HBr gas according to the equation:

$$PBr_3(1)+3H_2O(1,g) \rightarrow 3HBr(g)+H_3PO_3(1). \quad (1)$$

At 50% relative humidity this reaction is 63% complete in 87 milliseconds.

The distribution of the flame suppression agent is preferably tested with a non-reactive test agent 216 having properties similar to the HBr gas, rather than the distributed PBr$_3$ agent. That is, for testing a reactive agent fire suppression system, the test agent should be selected to have similar properties to the active species released from the reactive suppression agent, rather than similar properties to the suppression agent itself. In this way, the testing can determine if a critical mass of the active species is delivered to the appropriate regions for at least the critical time required to suppress a fire.

Krypton gas, (Kr) has been selected as an appropriate non-reactive substitute, or test agent, for the PBr$_3$ reactive agent because Kr's fluid dynamic properties, the characteristics that govern transport along flow path 215, are similar to those of the HBr active species of the PBr$_3$ reactive fire suppression agent. Such properties may include density, molecular weight, viscosity, thermal conductivity, and diffusivity.

Table I compares fluid dynamical properties of HBr with those of various atomic gases including Kr. However, any molecular gas that is unreactive in the fire zone and has similar fluid dynamical properties to the active species may also be considered when selecting a substitute. Hydrocarbons, either halogenated or unhalogenated, or simple oxides (CO, SO2, NO, CO2, N2O) are examples of unreactive molecular gases that may be considered as substitutes for reactive fire suppressants.

TABLE I

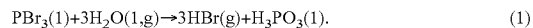

Fluid Dynamical Properties of HBr and non-reactive substitutes.

| Property | Units | HBr | Xe | Kr | Ar | Ne | He |
|---|---|---|---|---|---|---|---|
| Molecular Weight | g/mol | 80.912 | 131.3 | 83.8 | 40 | 20.179 | 4 |
| Density | kg/m$^3$ | 3.440 | 5.584 | 3.550 | 1.670 | 0.853 | 0.169 |
| Heat capacity (Cp) | kJ/mol ° K | 0.029 | 0.035 | 0.020 | 0.020 | 0.021 | 0.020 |
| Viscosity | millipoise | 0.171 | 0.211 | 0.233 | 0.210 | 0.297 | 0.186 |
| Thermal conductivity | mW/m-° K | 8.910 | 5.192 | 8.834 | 16.360 | 45.800 | 142.640 |
| Diffusion Coefficient (air) | cm$^2$/s | 0.428 | 0.340 | 0.463 | 0.672 | 1.453 | 3.105 |

During testing, test agent 216 (such as Kr gas) may be stored in a pressurized reservoir and used as a testable substitute for the transport of the fire suppressant (such as HBr) within the fire zone(s), in the partially enclosed space of test chamber 206. Chamber 206 is ventilated by the flow of air through an entrance aperture, such as inlet 208, to an exhaust, such as outlet 210. The air flow interacts with protuberances and boundaries, not shown, to create one or more flame holding regions in test chamber 206, such as flame holding regions 212 and 214. Agent flow path 215 may be selected to distribute the fire suppressant, and in this case the substitute fire suppressant, test agent 216, by the injection of the agent at an injection point upwind from the first flame holding region. Detector 222 samples gas from the flame holding regions through tubing 224.

Test agent 216 is applied by pulsed operation of gas valve 217 and admitted through tubing 218 to suppressant injection region 221. Tubing 218 may be capped by nozzle 220 to direct the flow of test agent 216. The pulse of test agent 216 applied by valve 217 may be characterized as having a duration, mass flow rate, and velocity profile. For testing purposes, the duration, mass flow rate, and velocity profile of the pulse of test agent 216 is selected to match the pulse to be used in the catalytic fire suppression agent proposed for use in the reactive fire suppression system. This match is important because the injection of either agent changes the pressure in the enclosed space and thereby alters the flows through the inlet 208 and outlet 210.

Test agent 216, such as Krypton gas (Kr), is transported during testing from injection point 221 by advection along natural flow paths or streamlines, such as agent flow path 215, and by diffusion across them. Each pulse of test agent 216 delivered by valve 217 via pipe 218 and nozzle 220, if used, to injection point 221 may then be sampled via tubing 224 from flame holding regions 212 and 214 by detector 222 to determine the density of test agent 216 delivered as a function of time. The correlation between the pulse width and density of each pulse of test agent 216 delivered to injection point 221 and the density as a function of time of test agent 216 sampled at each flame holding region may be used to quantify the effectiveness of the distribution or transport of test agent 216 via agent flow path 215 to each of the flame holding regions 212 and 214.

The testing process described above may be repeated for varied injection conditions to determine the effects of different injected masses, mass flow rates and pulse temporal profiles as well as changes in injection location, nozzle configuration, flame holding region location, ventilation and other conditions. In particular, a series of tests may be used to create a matrix of test agent distribution to aid the design for the distribution of the reactive agent of the fire suppression system. Once the tests are completed and analyzed, test agent 216 may be replaced by a reactive suppression transport agent which produces a suppressant having the same transport characteristics as the test agent.

Figure 23:
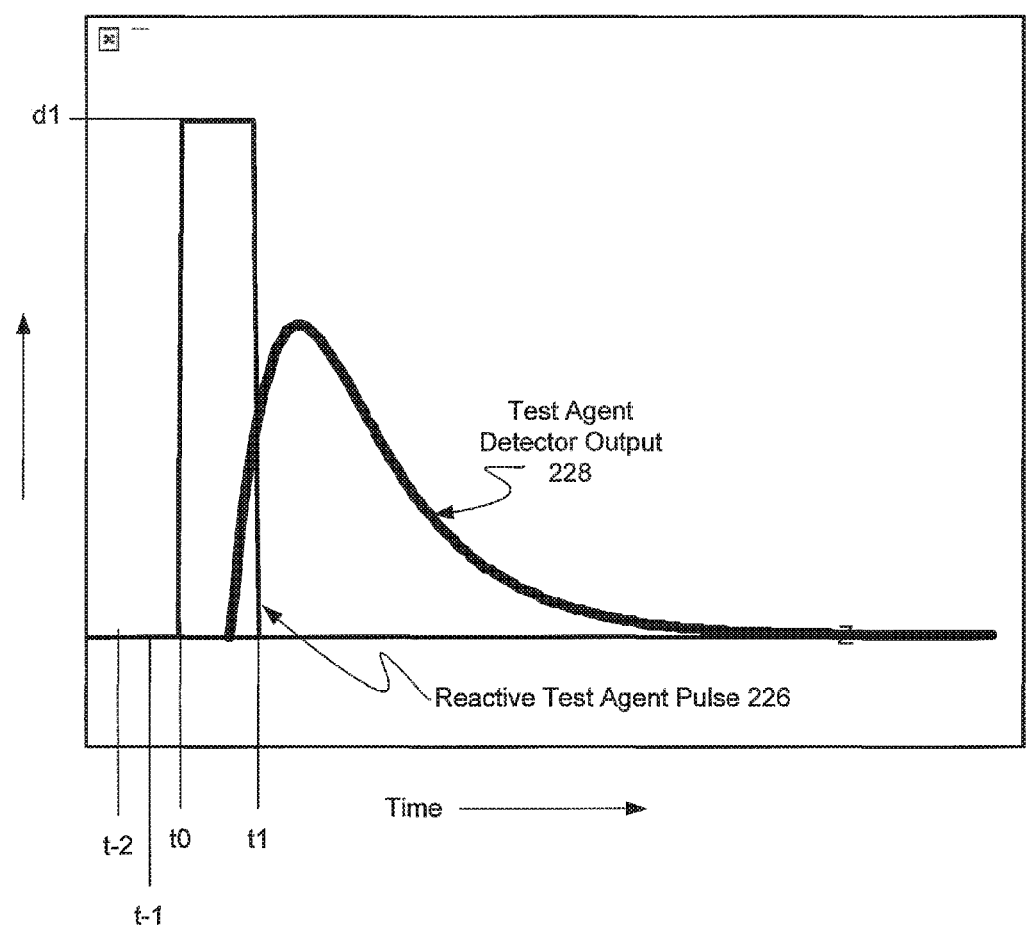
FIG. 23 is a graph comparing a pulse of test suppression agent with the density as a function of time of the test suppression agent detected at a flame holding region.

Referring now to FIG. 23, detector output 228 for a sample taken at a particular flame holding region, such as region 212, may be analyzed to determine the density as a function of time of the test agent 216 transported to each flame holding region. This density profile may be compared with test agent pulse 226 injected at injection point 221.

In particular, test agent pulse 226 begins at time t0 and ends at time t1. The pulse of krypton gas may have a duration, mass flow rate, and velocity profile that are chosen to match those possible for the reactive fire suppression system. The density of test agent pulse 226 has a particular value, d1. These values may be determined by the settings for the operation of valve 217 shown in FIG. 1 or detected by use of additional tubing 224 reaching to the general vicinity of nozzle 220 or injection point 221.

Detector output 228 shows that a detectable concentration or density of test agent 216 arrived at a detection point, such as flame holding region 212, at a particular time which could be before time t1. Detector output 224 rises in density to a peak and then decreases over time. Detector output 224 may be used to determine if a critical mass of the catalytic suppression agent is delivered for a given system configuration for the critical time required to extinguish fires in each flame holding region. This technique may also be used to test possible changes to the system to develop a matrix of results.

For example, the matrix of results could be used empirically to determine the best injection conditions. Preferably, the transport of test agent 216, and therefore the transport of the catalytic suppression agent within the fire zone, may be modeled using computational fluid dynamics so that optimal injection conditions can be efficiently identified with a sparse test matrix. Computational fluid dynamics may also be used to examine the effect of small differences between the fluid dynamical properties (e.g. diffusivity, density) of the catalytic suppression agent and the test agent.

Figure 24:
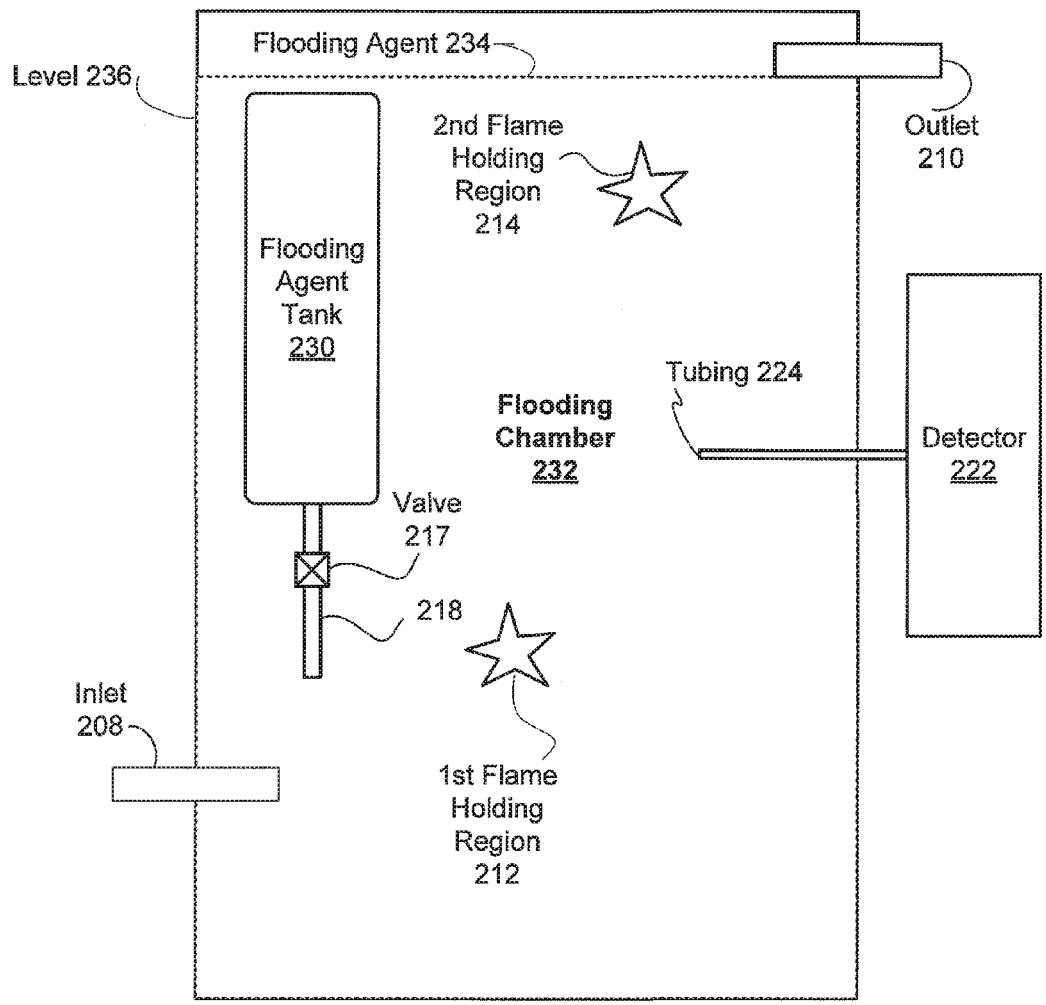
FIG. 24 is a block diagram of a fire suppression system using a flooding agent.

Referring now to FIG. 24, the use in flooding chamber 232 of a flooding or catalytic suppression agent 234 is shown for a flooding type suppression system to illustrate and compare the differences with a reactive suppression system, the testing of which is described above with respect to FIG. 21. Flame holding regions 212 and 214, shown in FIG. 21, are superimposed over flooding chamber 232 for convenience of description although conventional flooding type fire suppression systems do not typically identify or make use of the identification of fire holding regions. In use, flooding agent 234 is released from flooding agent tank 230 via valve 217 and pipe 218 for a predetermined amount of time. The time is selected, as well as the pressure in tank 230 and the characteristics of flooding agent 234, to provide a predetermined fill level of flooding of chamber 232, such as level 236 has been reached. Fill level 236 may represent 100% of the interior volume of chamber 232.

A flooding type fire suppression system may be used with a catalytic suppression agent, either by using the catalytic suppression agent in flooding agent tank 230, or preferably, by using a reactive transport agent in flooding agent tank 230 and introducing the agent into an environment in which the reactive transport agent produces the catalytic suppression agent upstream from the fire zone. For example, if $PBr^3$ were used in flooding agent tank 230, sufficient moisture could be introduced, from the atmosphere or other source, into valve 217 or preferably pipe or tubing 218 or more preferably in nozzles if used in order to release the catalytic suppression agents. This technique may be particularly useful in situations in which it is desirable to reduce the required size and or weight of flooding agent tank 240.

Conventional testing for a flooding agent such as Halon 1301 is typically performed to determine if the flooding fire suppression system provides a predetermined standard level of concentration. The FAA standard for jet engine compartments, for example, currently requires a concentration of more than 6% by volume of the flooding agent for more than half a second measured at discrete locations. Detector 222 and one or more pipes or tubing 224 may be used to make these measurements.

The testing technique described above for testing the effective distribution of a flooding suppression agent in chamber 232 would not be useful in the testing of a reactive fire suppression system as discussed above with reference to FIG. 22.

Figure 25:
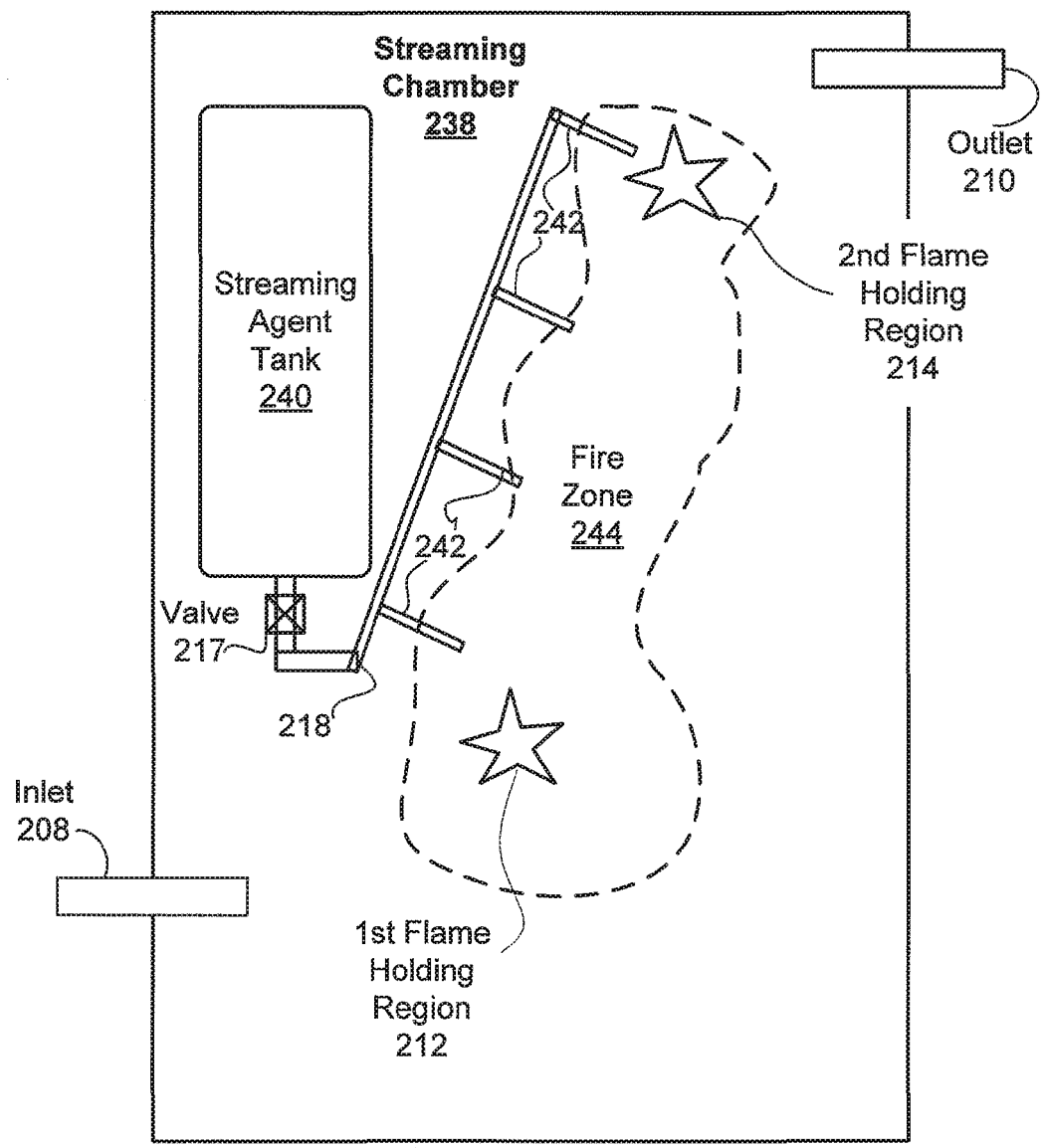
FIG. 25 is a block diagram of a fire suppression system using a streaming agent.

Referring now to FIG. 25, chamber 238 may be used for streaming fire suppression systems, with a conventional streaming suppression agent or a catalytic suppression agent and has flame holding regions 212 and 214 superimposed thereon in the figure for the reasons discussed above. In a streaming fire suppression system, the conventional technique provides one or more streams of a first suppression agent from streaming agent tank 240, via pipe 218, and valve 217, which are directed by one or more streaming nozzles 242 onto the expected fire zone, such as fire zone 244. Fire zone 244 is an area enclosing all expected flames from a hopefully representative fire.

These fires, illustrated herein as fire zone 244, are variable in their propagation, spatial extent, and intensity. Testing of a streaming fire suppression system is typically performed by testing to determine the actual extinguishment of a fire. The expense of setting and extinguishing a statistically significant number of these fires can be prohibitive, especially when the partially enclosed space contains valuable equipment such as turbine engines, telecommunication switches, computer systems, flight instrumentation, and the like.

A streaming type fire suppression system may be used with a catalytic suppression agent, either by using the catalytic suppression agent in streaming agent tank 240, or preferably, by using a reactive transport agent in streaming agent tank 240 and introducing the agent into an environment in which the reactive transport agent produces the catalytic suppression agent upstream from the fire zone. For example, if $PBr_3$ were used in streaming agent tank 240, sufficient moisture could be introduced, from the atmosphere or other source, into valve 217 or preferably pipe or tubing 218 or more preferably nozzles 242 in order to release the catalytic suppression agent. This technique may be particularly useful in situations in which it is desirable to reduce the required size and or weight for streaming agent tank 240.

The techniques for testing flooding and streaming fire suppression systems are not directly useful for testing reactive fire suppression systems.

First, conventional flooding agents such as Halon 1301, HFC-125 ($C_2HF_5$), $CO_2$, and the like are not depleted by chemical reactions in the fire zone. Reactive fire suppression agents are transformed by the environment in the fire zone through reaction with moisture, oxygen, surfaces, heat, or chemical species produced by the fire. Flooding concentrations are determined only by fluid dynamics within the enclosure, whereas reactive species concentrations are also affected by chemical reactions in the fire zone.

Further, flooding systems are designed to develop uniform concentrations throughout the enclosure or chamber. Elaborate manifolds with nozzles, tubing, and other distribution means are often employed in total flooding systems. By contrast, reactive systems are designed to exploit natural flows within the enclosure to transport reactive species preferentially to flame holding regions. Since not all locations are equally likely to support combustion, reactive systems facilitate suppression with smaller masses and volumes of agents than are required for flooding systems.

Similarly, testing streaming fire suppression systems is very cumbersome and expensive because testing is conducted until the actual fire is extinguished.

Figure 26:
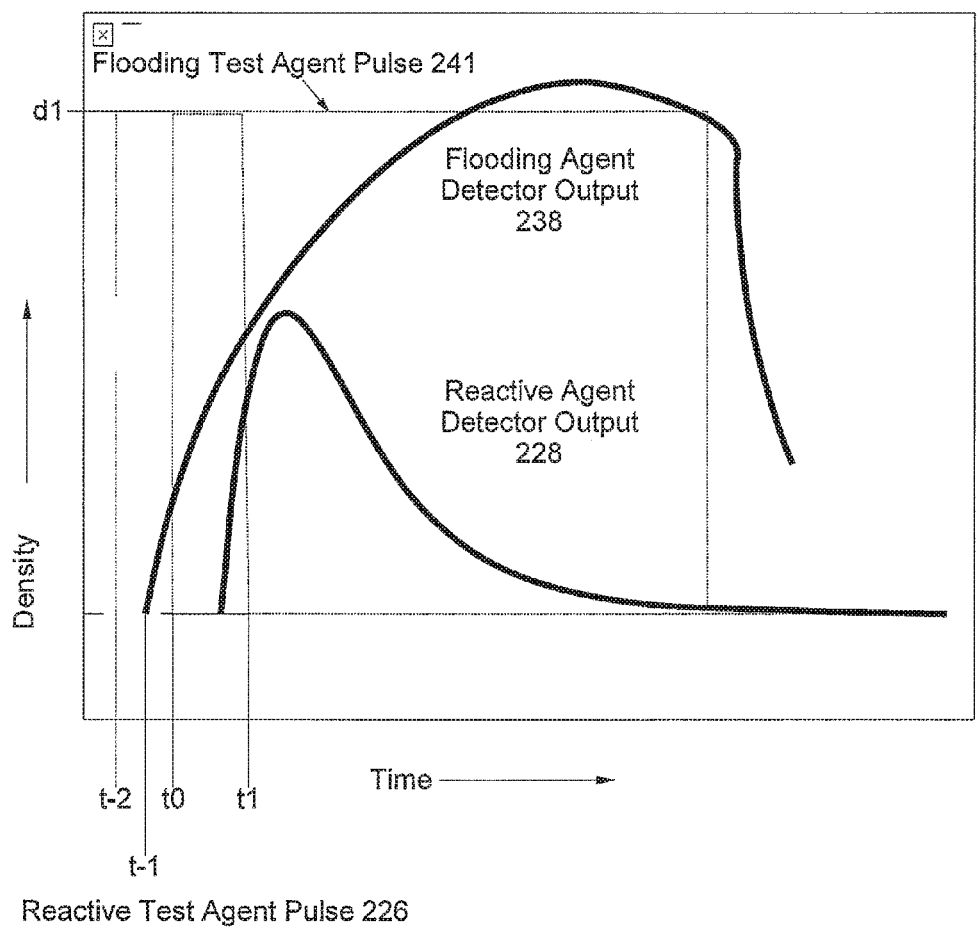
FIG. 26 is a graphical representation of reactive and flooding agent pulses and detector outputs.

Referring now to FIG. 26, it is, however, desirable and important to be able to quantize the effectiveness of a reactive fire suppression system at least by setting minimum standards by which the distribution of suppression agent can tested. Similarly, it is also desirable and important to be able to compare standards used for different types of fire suppression systems such as flooding and reactive systems. Reactive test agent pulse 226 and resultant reactive agent detector 228, as functions of density and time as shown above in FIG. 22, are shown superimposed on flooding test agent pulse 240 and flooding agent detector output 238. Assuming, for discussion purposes, that the FAA standard above provides satisfactory fire suppression with flooding agent pulse 240 long enough to provide the flooding suppression agent at 6% volume for half a second, its clear that a pulse of reactive suppression agent that will produce at least the equivalent of the 6% volume for half a second in the flow paths leading to the flame holding regions may require substantially less suppression agent than required for flooding.

The pulse of flooding agent must flood the entire chamber while the pulse of reactive agent need only be located in the vicinity of a flame holding region for an equivalent time without having to flood the entire chamber. Further, depending upon the configuration of the environment to be protected by reactive fire suppression system, a pulse of reactive fire suppressant or of test agent 216, as shown in FIG. 21, may be used to extinguish the fire at more than one flame holding region. For example, a pulse of reactive or test agent carried first to the vicinity of flame holding region 212 along agent flow path 215 will then be carried further along path 215 to second flame holding region 214. Although it may be necessary for such a pulse to be of somewhat longer duration in order to satisfactorily suppress a fire at two flame holding regions rather than one, the required duration or dwell of the pulse of reactive suppression agent will still be much less than twice the duration of the pulse required to suppress the fire at one flame holding region.

Still further, reactive fire suppression agents have an additional advantage over flooding fire suppression agents because the reactive fire suppression agent reacts chemically with the environment of the fire zone to produce catalytically potent suppressant materials. For example, as noted above, reactive fire suppression agent $PBr_3$ reacts with moisture to produce HBr gas which suppresses the fire by catalytically interfering with flame chemistry. Catalysis, in which one molecule may facilitate the transformation of many millions of flame reactions, is only weakly dependent on the concentration of catalyst. Therefore the equivalent fire suppression provided by 6% by volume of a flooding fire suppression agent, such as Halon 1301, for more than one half second can be provided by a substantially lower concentration of a catalytic fire suppression agent such as $HBr_3$ for the same one half second or less.

For example, as noted above, the metric for a reactive fire suppression system may be a requirement that a reactive fire suppression agent deliver a minimum of 110% to 200%, and more preferably 150% to 175% of the catalytic suppression agent to the flame holding regions for the same length of time, compared to the minimum requirements for a flooding type system.

Figure 27:
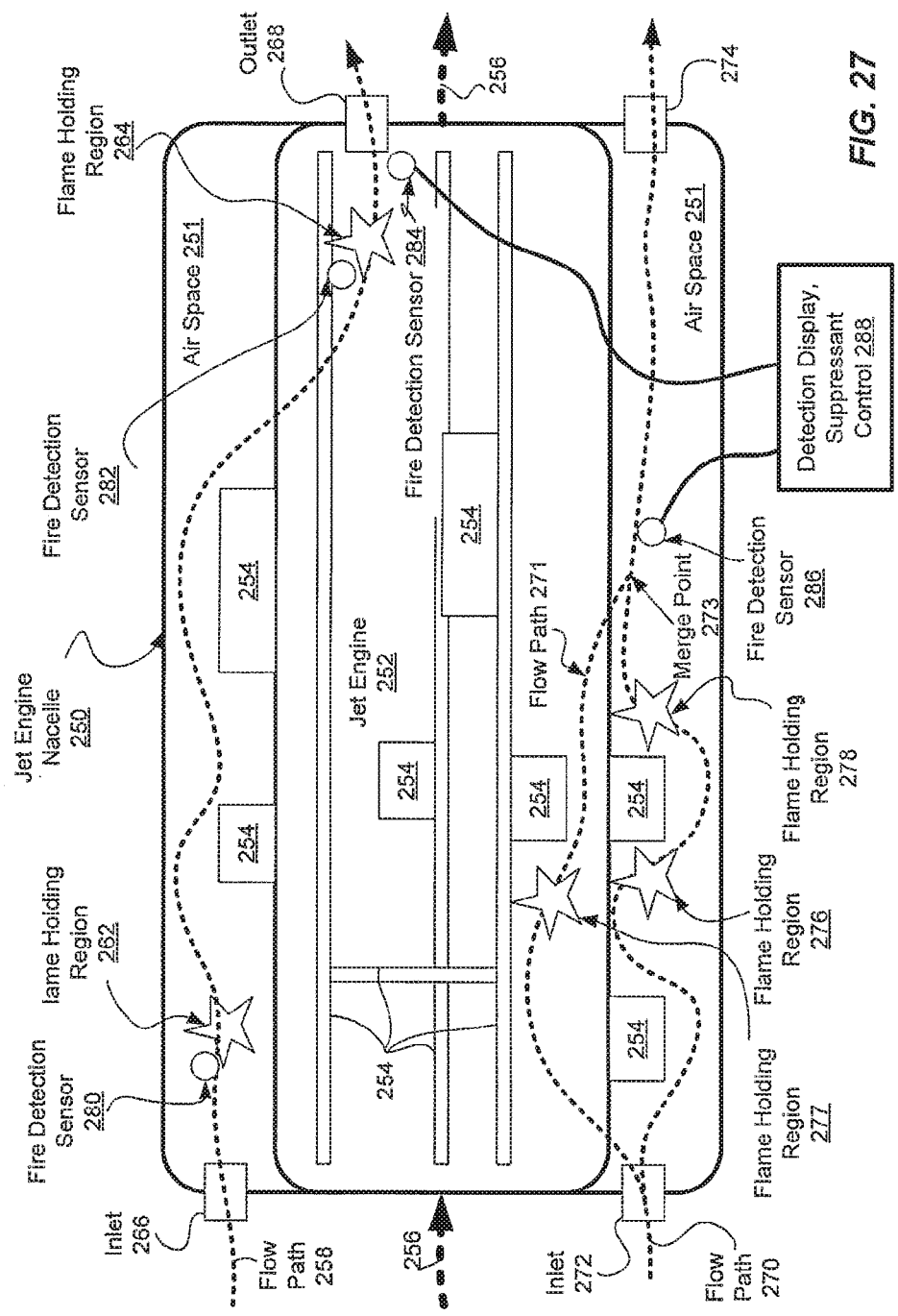
FIG. 27 is a cutaway view of the jet engine nacelle of FIG. 21 including a fire detection system.

Referring now to FIG. 27, which illustrates a modified view of jet engine nacelle 250, air space 251 and jet engine 252 as shown in FIG. 21, flame holding regions 262 and 264 lie along flow path 258 which flows into the fire zone from a first inlet shown generally as inlet 266 and exits the fire zone at an outlet shown generally as outlet 268. Fire zones, such as airspace 251, may have more than one inlet and outlet and therefore more than one flow path. Flow path 270, entering air space 251 via inlet 272 and exiting via outlet 274 is illustrated as one example of an additional flow path. Flow path 270 may also have multiple flame holding regions such as regions 276 and 278.

Additional flow paths may also enter and/or exit via the same inlets and/or outlets. For example, flow path 271 may also enter air space 251 via inlet 272 and exit via outlet 274 while following a path differing in part or in whole from flow path 270. As shown in the figure, flow paths 270 and 271 join at merge point 273 and from there flow together to exit via outlet 274. As illustrated, flow path 271 includes flame holding region 277.

Fires at flame holding regions, such as regions 262, 276, 277 and 278, release products of combustion including radiation of heat and light, gases such as $CO_2$, $H_2O$, and other compounds resulting from combustion of fuel, and particles of smoke. In order to detect a fire at a flame holding region, one or more of these combustion byproducts must be detected. One method would be to position a detector proximate to each flame holding region in the fire zone. For example, fire detection sensors 280 and 282 may be positioned adjacent flame holding regions 262 and 264 respectively in order to detect and distinguish fires in these regions.

However, the gaseous and particulate byproducts may be transported by natural flows along identifiable flow paths within the fire zone. Therefore, a single fire detection sensor, such as sensor 284, may be positioned adjacent outlet 268, inside or outside nacelle 250, to detect a fire at any flame holding region whose flow path exits at that outlet. In particular, as shown, a fire at either or both flame holding regions 262 and 264 would be detected by sensor 284.

Similarly, if natural flows from more than one flame holding region intersect, then a single sensor placed proximate or downstream to the intersection would sense combustion byproducts from either of these flame holding regions. As shown, flow paths 270 and 271 intersect at merge point 273, so that flow paths from flame holding regions 276, 277 and 278 all intersect at merge point 273. Fire detection sensor 286, placed between merge point 273 and outlet 274 may therefore be used to detect fires at all fire holding regions along flow paths 270 and 271 which intersect at merge point 273. In particular, fires at one or more of flame holding regions 276, 277 and 278 may be detected by fire detection sensor 286.

Similarly, a single detector may sample combustion gases and smoke from three or more flame holding regions if it is placed proximate to the intersection of the corresponding natural flow paths.

In a complex fire zone there may be very many flame holding regions, so that the complexity and expense of providing a detector for each flame holding region is high. Using natural flows in the fire zone, which can be discovered by computational fluid dynamic simulations or flow visualization experiments, for example, one can arrange for the ratio of detectors to flame holding regions to be less than one and, preferably, as small as one divided by the number of flame holding regions. This latter bound corresponds to a single detector that is positioned to detect smoke or gases produced at any of the flame holding regions within the fire zone. Since all points within the fire zone are ultimately connected with at least one of the outlets 268 and 274, it is apparent that a detector at each of the outlets will provide sensing of any fire within the fire zone. However, this number of detectors may not sense fire in all of the flame holding regions with sufficient resolution in space and time to be optimal. In other words, the selection of the number and placement of sensors using natural flow paths to transport combustion products to them may also include considerations of redundancy, time response, and localization of the fire within the fire zone.

In typical cases where the number of detectors is greater than one and less than the number of flame holding regions, signals from each detector may provide information about fire at the subset of flame holding regions that are linked by natural flows to specific flame holding regions. This information can be used to selectively activate the delivery of suppressant to the specific flame holding regions where fire has been detected. Preferably, the suppressant is a reactive suppressant transport agent that follows natural flow paths to deliver catalytically active fire suppressant atoms or molecules to the flame holding regions where combustion gases or smoke have been detected.

Detection of fire at a subset of the flame holding regions within a fire zone may be provided by a visible display to a human operator, who then decides which subset of fire suppression systems to discharge. Preferably the flame detector that samples from a subset of flame holding regions is linked with a logic circuit that automatically arms or discharges one or more reactive suppression systems that deliver suppressant to the same subset of flame holding regions. In particular, detection display/suppressant control 288 may be provided and connected to the fire detection sensors, such as sensor 284 and 286, to detect and automatically provide suppressant to fires in air space 251 while providing a visual display and record of fire detection and suppression activities if desired.

The nature of the detector varies with the nature of the fire whose detection and extinguishment is desired. A fuel rich hydrocarbon fire, for example, will produce voluminous smoke whose detection by light scattering or mobility detection is well known. A lean hydrocarbon fire may produce less smoke but a large quantity of CO and $CO_2$, which can be detected by infrared absorption, mass spectrometry, Raman scattering, photoacoustic spectroscopy, and other methods of analytical chemistry. Yet another fire in a flame holder near combustible plastic may produce byproducts such as HF, HCN, NO, $SO_2$, and other gases whose concentration is minimal unless a fire is present. These may be detected by surface acoustic wave sensors, chemical field effect transistors, resonance fluorescence, or other analytical chemistry techniques.

Heating of gases, both combustion products and air, occurs at the flame holding regions. Hot gases can be transported by convection along natural flow paths, and a sensor may detect the optical i.e. infrared radiation that they emit as they cool radioactively.

Identification of flame holding regions within a fire zone, and their links to natural flow paths, allow both detection and suppression to be concentrated on those regions where fire is most likely. This aspect allows reduction in the number and complexity of the systems used for detection and suppression.

Figure 28:
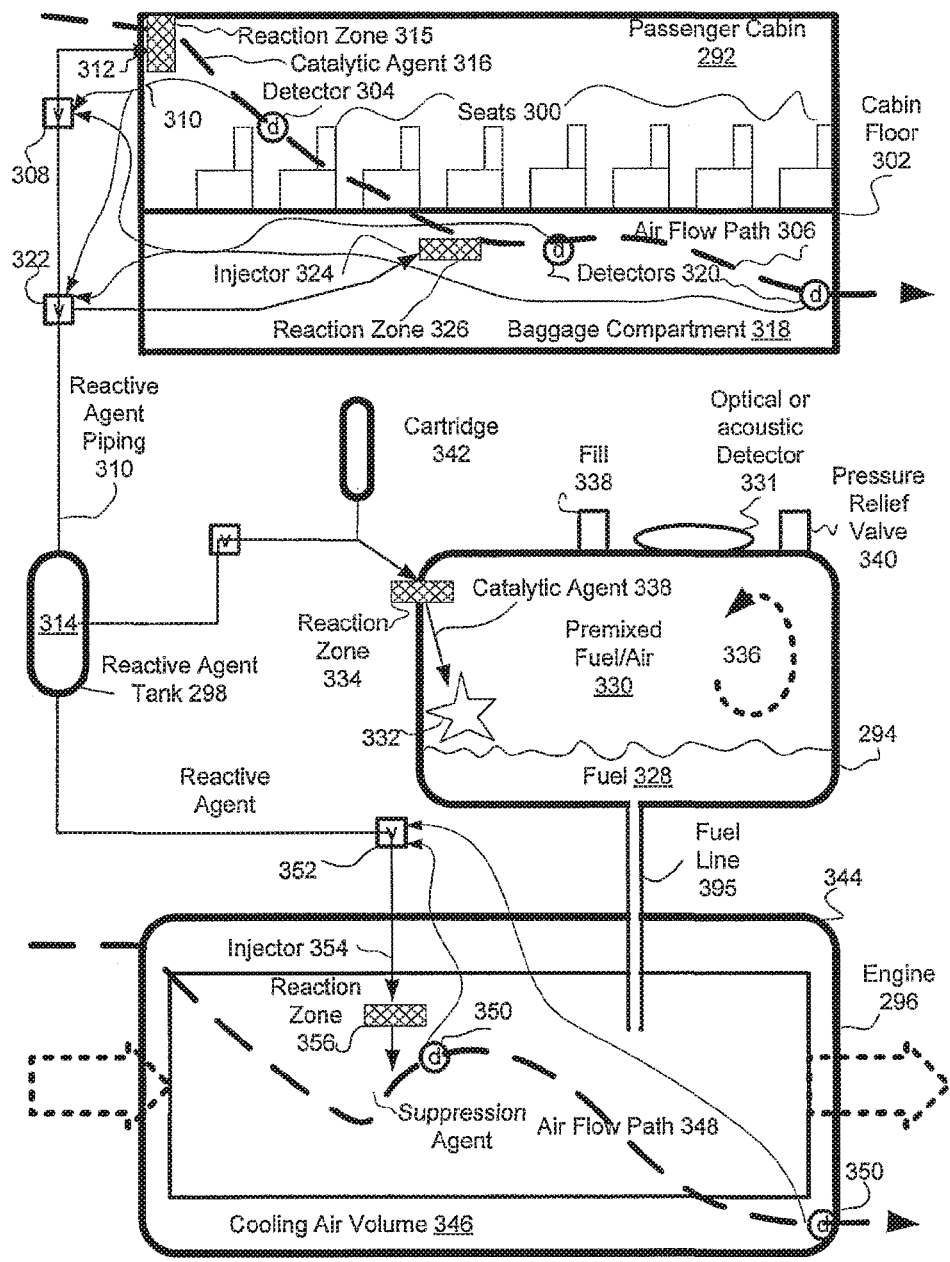
FIG. 28 is a schematic view of a fire suppression system in an aircraft.

Referring now to FIG. 28, aircraft 290 includes passenger cabin 292, fuel tank 294, aircraft engine 296, reactive agent tank 298 and various lines and valves for releasing the reactive agent manually or upon detection of a fire by any of the various fire detection sensors.

Passenger cabin 292 includes passenger seats 300 mounted on cabin floor 302 as well as passenger cabin fire detector 304 positioned in passenger cabin 292 along air flow path 306. Upon manual operation, detection of a fire by detector 304 or detection of a fire in another portion of aircraft 290 which by design activates fire suppression in passenger cabin 292, valve 308 is activated by connection 310 (which may be associated with a computer or other fire control circuitry) to release reactive agent 314 through reactive agent piping 310 into passenger cabin 292 via injector 312. The position and direction of flow of injector 312 is selected to deploy reactive agent 314 from tank 298 through piping 310 onto reaction zone 314 which may be a pre-existing portion of the environment of passenger cabin 292 or a specially introduced or modified portion of passenger cabin 292 which causes reactive agent 314 to react, for example with moisture or heat, in order to introduce a catalytic fire suppressing agent into air flow path 306 which flows through passenger cabin 292 to suppress any fires therein.

Air flow path 306, as shown, also passes through baggage compartment 318 beneath cabin floor 302. Baggage compartment fire detectors 320 are also positioned along air flow path 306 and are connect via connections 310 to valve 322. Upon detection of a fire, reactive agent 314 is applied from tank 298 via piping 310 and valve 322 through injector 324 into reaction zone 326. Reactive agent 314 reacts in reaction zone 326 to produce catalytic agent 316 which suppresses the fire detected by detectors 320.

As shown in the figure, line 310 from detector 304 is connected to valve 322 as well as valve 308 and detectors 320 are connected via line 310 to valve 308 as well as valve 322. In this way, the aircraft fire control systems may selectively elect to activate valve 308 in passenger compartment 292 to aid in suppressing fires detected in baggage compartment 318 and/or selectively elect to activate valve 322 to prevent fires detected in passenger compartment 292 from being ignited in baggage compartment 318 along air flow path 306.

Aircraft 290 also includes one or more fuel tanks 294 which are typically partially full of fuel 328. The remainder of the tank above the fuel may include a combination of vapor and air 330, also known as ullage, which can result in a premixed flame when a source of ignition at ignition point 332, such as a spark or hot surface, is present. Ignition of a premixed flame generates a combustion wave whose propagation speed through the reacting mixture may conventionally be divided into three categories:
1. Explosion: The rate of heat generation is very fast but does not require passage of a combustion wave through the exploding medium.
2. Deflagration: A subsonic combustion wave.
3. Detonation: A supersonic combustion wave.

The characteristics of deflagration and detonation waves are derived using the Rankine-Hugoniot equations based on thermodynamic parameters on either side of the wave as set forth in standard texts on combustion theory, for example chapter 4 of Principles of Combustion by Kenneth K. Kuo (New York: Wiley) 1986, which is incorporated herein by reference.

The Rankine-Hugoniot relation (equation 4-27 in Kuo) is $$q = \frac{\gamma}{\gamma-1}\left(\frac{p_2}{\rho_2} - \frac{p_1}{\rho_1}\right) - \frac{(p_2-p_1)}{2}\left(\frac{1}{\rho_1} + \frac{1}{\rho_2}\right) \quad (0.1)$$

In this expression q is the heat release per unit mass, $\gamma$ is the ratio of specific heats at constant pressure and constant volume, p is the pressure, $\rho$ is the density, and subscripts refer to conditions in unburned (1) and burned (2) gases that are in front of and behind the combustion wave, respectively.

The interplay among the gases' characteristics ($\gamma$, $\rho$, and p) and the heat release q determine whether the combustion wave is supersonic or subsonic, in other words, whether a deflagration or detonation wave results. Although this relationship is complex and mathematically nonlinear, the essential point for the purposes of the present discussion is that reduction of the heat release q causes a reduction in the velocity of the combustion wave and also a decrease in the prospect of deflagration evolving into detonation. This fact may alternatively viewed as a direct consequence of continuity and conservation laws for energy and momentum. The prevention of detonation of fuel air mixtures in fuel tanks is a high priority in the aircraft industry.

Conventional fire detection sensors may not be fast enough to permit fire suppression to prevent detonation. Optical or acoustic detection of ignition of the initial combustion wave, by specialized detector 331, may be used to trigger rapid injection of reactive suppressant agent 314 (which may be the same as the reactive agent in tank 298 or from another source) that catalyzes in reaction zone 334, or directly at ignition point 332, to produce a reduction of heat release (q) in the combustion wave from ignition point 332. Premixed fuel/air 330 may be mixed by physical motion or convection to produce convection currents 336 in the tank ullage 330. Fuel tank 294 generally has a fill port 338 and a pressure relief valve 340. A spark or flame at ignition point 332 emits light or sound that is sensed by optical or acoustic detector 331 that may in turn be used to trigger a rapid and forceful injection of reactive agent 314 into the combustion wave that is propagating from the ignition point 332 at high a velocity.

Reactive zone 334 catalyzes reactions that reduce the heat release q and thereby the wave propagation velocity according to the Rankine-Hugoniot relation. The extent to which the catalytic agent reduces heat release, and thereby the combustion wave velocity, and its potential transition from deflagration to detonation depends in calculable ways on the catalytic agent flux as well as the pressures, densities, and compositions of the combustible fuel/air mixture 330. The amount and type of catalytic agent 338, as well as the mode and geometry of its injection into the evolving combustion wave at ignition point 332, may be determined using the Rankine-Hugoniot relation and inherent properties of the fuel, air, and reactive agent that is to be deployed. Optimization of the agent composition, quantity, and injection may be accomplished according to methods familiar to those practiced in the arts of applied mathematics and combustion physics.

An array of one or more optical sensors 331 may be deployed to provide a complete view of ullage 330 in aircraft fuel tank 294. In lieu of using reactive agent 314 from tank 294, one or more cartridges 342 may be used, when activated by detector 331, to more forcefully propel the reactive agent swiftly into the field of view of the corresponding sensor 331, thereby reducing heat release (q) and slowing or halting the combustion wave.

The inhibition of detonation and deflagration waves using reactive fire suppression may be distinguished from the discussions above by not requiring flame attachment points since the oxidizer and fuel are premixed in ullage 330. Nevertheless, exploitation of the flow properties of the reactive agent to swiftly transport it to a combustion zone may be profitably used. For example, the labile bromine agent $PBr_3$ has low viscosity and a density greater than that of aluminum. The pressurization and orifice geometry of a fire suppression cartridge 342 can be adjusted to achieve high speed (many meters per second) flow of agent in selected directions whose momentum and kinetic energy are sufficient to overcome a countervailing combustion wave from ignition point 332.

Aircraft 290 also includes one or more engines 296 which may be jet or other engines fueled from tank 294 surrounded by nacelle structure 344 forming a cooling air volume 346 in which natural air flow path 348 is present during operation of engine 296. Fire detection sensors 350 may be positioned along air flow path 348 and/or at outlets of the air flow path from the engine. Upon detection of a fire by detectors 350, valve 352 may be activated to release reactive agent 314 (or a different agent) from tank 298 via injector 354 into reaction zone 356 to suppress the fire. As shown in the figure, fuel 328 is provided to engine 296 via fuel line 395 from tank 294.

Figure 29:
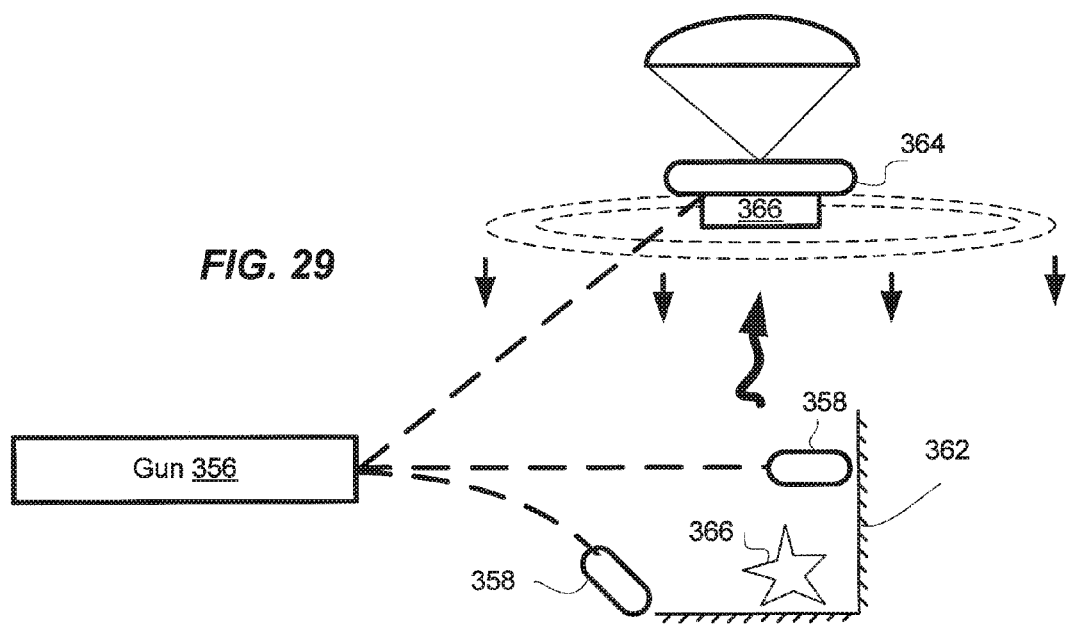
FIG. 29 is a side view of a fire suppression system using a projectile for transporting the reactive fire suppression agent to the vicinity of the combustion zone.

Referring now to FIG. 29, a reactive fire suppression agent may also be delivered in a projectile directly to a combustion zone or in a projectile which releases the agent in the air above the combustion zone. In particular, the projectile may be launched by delivery device 358 which may range in size from a hand held projectile to a shoulder mounted bazooka or even a tank mounted cannon depending on the required size of the projectile and the distance it must travel. For small projectiles, the relatively small size and weight required for the reactive fire suppression agent may make it convenient to use hand launched containers or a plastic bullet fired by a pistol.

Gun 356 may be used to launch grenade like projectile 358 toward combustion zone 366. Projectile 358 may include a quantity of reactive fire suppression agent which is released upon impact with the ground or a portion of a structure such as wall 362. Projectile 358 may also contain an explosive, detonated on impact or remotely, to dispense the reactive fire agent. The reactive fire agent may then react with the environment of the combustion zone, or a reactive surface affixed to projectile 358, to release catalytic species which react catalytically to suppress the fire in combustion zone 366.

Projectile 364 may be launched by firefighters or others using gun 356, by hand or by an aircraft, not shown, and caused to release a cloud or aerosol of reactive agent that is transported by gravity and the natural convective flows present in a fire to the combustion zones, such as zone 366, where they catalytically extinguish flames. Projectile 364 can be delivered in a direct manner, in other words along a line of sight as in a bullet, grenade, rocket, or missile. Alternatively projectile can be delivered by indirect or lofted trajectories as in a mortar round, an artillery shell, or a hand grenade. As shown in the figure, projectile 364 may be suspended by a parachute, in the manner of a flare, over combustion zone 364.

These embodiments permit remote extinguishment that is particularly useful when fire is to be suppressed in an environment where hazardous, combustible, or explosive materials are present such as an ammunition depot, chemical warehouse, or fuel storage bunker. Furthermore, the weight and size of reactive fire suppression projectiles is generally much less than that of hand-held or wheeled extinguishers with the same capacity for extinguishment, which is advantageous for portable protection of firefighting personnel.

Projectile 364 may release the reactive agent by mechanical or explosive means. Examples of mechanical dispersion include pressurization or fracture of the projectile and splatter of the contents by the force of impact. Explosive means of dispersion include shaped charges such as are used in chemical warfare or fuel-air explosive munitions.

In some configurations, projectiles 358 and 364 may also be equipped with a reaction zone, such as zone 366, which causes the reactive agent in the projectile to react at least in part as it is released from the projectile before it reaches fire zone 360.

Projectile 364 uses flows driven by gravity to deliver the reactive agent into a combustion zone such as zone 360. Projectile 364 may include a cartridge containing a reactive agent surrounding an internal explosive or propulsive device. Projectile 364 may be launched vertically over a fire zone. At a preselected elevation, or time, the explosive may be caused to detonate and disperse the reactive agent in a cloud whose spatial extent is determined by the shape and explosive power of the internal charge. Reactive agents whose density is greater than that of air, for example $SOBr_2$ (density 2.68 $g/cm^3$), when dispersed as an aerosol cloud will settle under the influence of gravity over an area that encompasses one or more combustion zones. The natural convective flows of a fire will transport the agent into the combustion zones and catalytically extinguish the fire.

Figure 30:
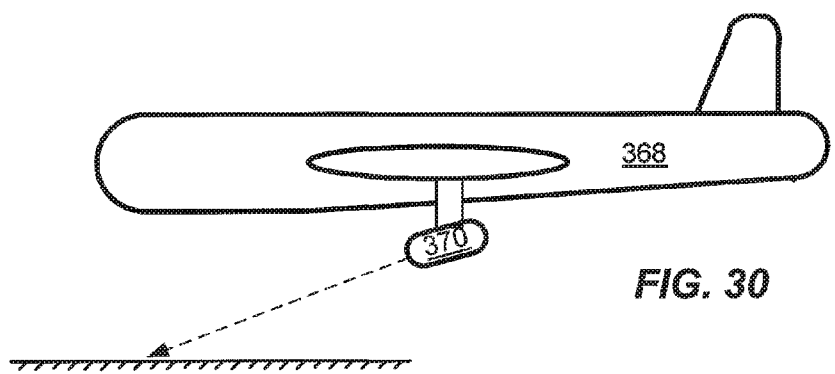
FIG. 30 illustrates an embodiment in which a fire suppression agent is disbursed by an aircraft during an emergency landing.

Referring now to FIG. 30, aircraft 368 may carry projectile 370 containing a reactive fire suppression agent for crash landings. A manual or automatic system may be used to launch or detach projectile 370 from aircraft 368 just before or following an emergency or crash landing in order to suppress fires which may result from the landing. In particular, projectile 370 may be launched just before the landing so that the reactive agent is provided to the potential combustion zone. This permits projectile 370 to be mounted in many different locations and protected from jamming by the impact of the landing. Alternatively, the reactive fire suppression agent may be release from container 370 after impact, for example, under the wing tanks of aircraft 368.

Figure 31:
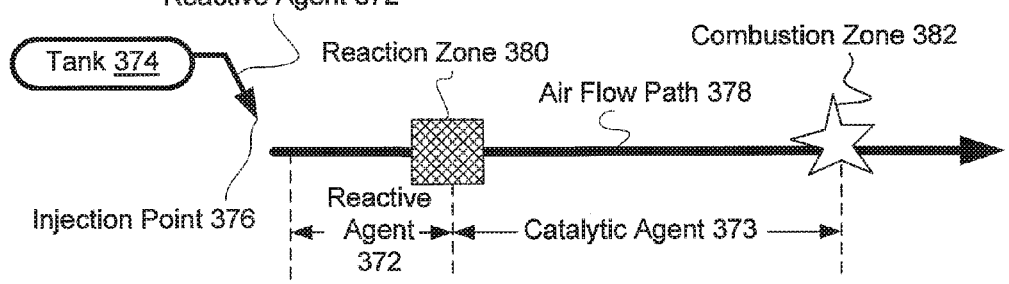
FIG. 31 is a schematic illustration of a fire suppression system useful in aircraft.

Referring now to FIG. 31, a view of a typical fire suppression system used, for example, in an aircraft, is shown in schematic form in which reactive fire suppression agent 372 from tank 374 is injected at injection point 376 at or adjacent air flow path 378 upstream of combustion zone 382. Reactive agent 372 reacts in reaction zone 380 to produce and release catalytic agent 373 upstream of combustion zone 382. Catalytic agent 373 is then transported by air flow path 378 to combustion zone 380 where agent 373 suppresses the fire by catalysis in combustion zone 382.

It is important to note that injection point 376 may be on flow path 378 or the momentum of the reactive agent 372, for example as a result of pressurization in tank 374, may cause reactive agent 372 to be transported to air flow path 378. As noted above, in other embodiments, reactive agent 372 may be injected in an upstream direction against the flow air path 378.

It is also important to note that reaction zone 380 may be on or adjacent flow path 378 or at or adjacent injection point 376 as long as in this embodiment catalytic agent 373, released by interaction between reactive agent 372 and reaction zone 380 upstream of combustion zone 382, is carried by air flow path 378 downstream to combustion zone 382 to suppress the fire. In particular, reaction zone 380 may be affixed to tank 374, and/or located at or adjacent injection point 376 in which case reactive agent 372 may not be transported a long distance or at all along flow path 378. In this embodiment, catalytic agent is, however, transported from reaction zone 380 downstream along air flow path 378, to combustion zone 382.

Figure 32:
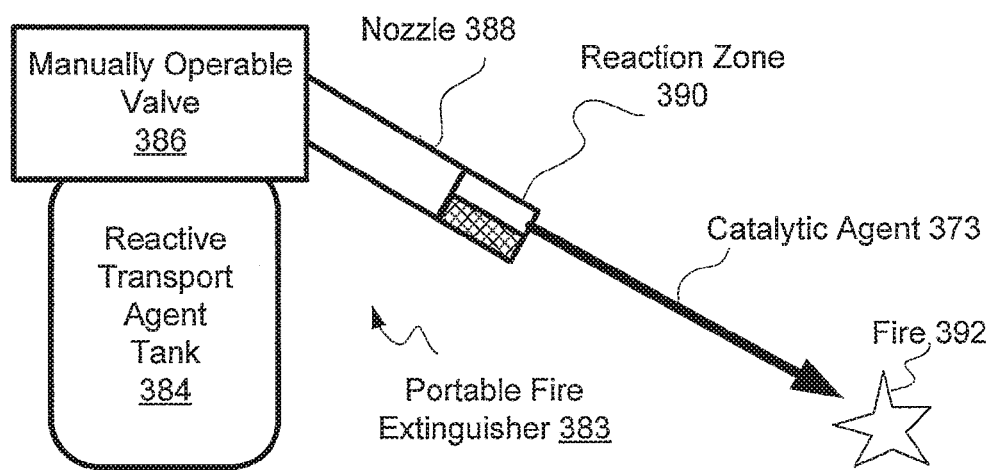
FIG. 32 is a side view of a portable fire extinguisher.

Referring now to FIG. 32, an alternate embodiment is shown in which portable fire extinguisher 383 includes reactive transport agent tank 384 and manually operable valve 386 for releasing the reactive transport agent to nozzle 388. Nozzle 388 includes reaction zone section 390 in which the reactive transport agent reacts to release catalytic agent 373 which is propelled, for example by pressure in tank 384 and/or a pumping action related to operation of nozzle 388, to the vicinity of fire 392 which is thereby extinguished by catalysis.

Various features of the present invention have been described with reference to the above embodiments. It should be understood that modifications may be made to the disclosed systems for suppressing fire, the disclosed methods for suppressing fire and the disclosed methods for designing a system for suppressing fire without departing from the spirit and scope of the present invention.

What is claimed is:

1. A fire suppression system, comprising:
   a structure having a source of fuel, an air intake and an outlet so that air flows in an air flow path through the structure between the air intake and the outlet, wherein the structure defines
      a volume,
      one or more flame holding regions capable of sustaining a spatially stable flame in the presence of an oxidizer and fuel, and
      one or more predetermined natural flows of at least one of an oxidizer and a fuel within the volume that respectively pass through one or more predetermined said flame holding regions;
   a fire suppressing agent; and
   an injection point disposed at the structure with respect to at least one of the one or more predetermined natural flows so that releasing the fire suppressing agent at the injection point into the at least one of the one or more predetermined natural flows causes the at least one of the one or more predetermined natural flows to transport the fire suppressing agent to at least one of the one or more predetermined flame holding regions and so that a minimum amount of the fire suppressing agent sufficient to suppress a fire at the at least one of the one or more predetermined flame holding regions when injected into the at least one of the one or more predetermined natural flows is less than a minimum amount of the fire suppressing agent sufficient to suppress the fire by flooding the volume.

2. The system of claim 1, wherein the fire suppressing agent is transportable by the air flow path to at least one area of recirculation in the structure.

3. The system of claim 1, wherein the at least one of the one or more predetermined natural flows passes through two said predetermined flame hold regions.

4. The system of claim 1, wherein the structure defines multiple said predetermined flame holding regions and at least one respective said predetermined natural flow for each said predetermined flame holding region of the multiple said predetermined flame holding regions, and further comprising a respective said injection point for each said at least one respective said predetermined natural flow.

5. A fire suppression system, comprising:
   a structure having a source of fuel, an air intake and an outlet so that air flows in an air flow path through the structure between the air intake and the outlet, wherein the structure defines
      a volume,
      one or more flame holding regions capable of sustaining a spatially stable flame in the presence of an oxidizer and fuel, and
      one or more predetermined natural flows of at least one of an oxidizer and a fuel within the volume that respectively pass through one or more predetermined said flame holding regions;
   a fire suppressing agent;
   an injection point disposed at the structure with respect to at least one of the one or more predetermined natural flows so that releasing the fire suppressing agent at the injection point into the at least one of the one or more predetermined natural flows causes the at least one of the one or more predetermined natural flows to transport the fire suppressing agent to at least one of the one or more predetermined flame holding regions and so that a minimum amount of the fire suppressing agent sufficient to suppress a fire at the at least one of the one or more predetermined flame holding regions when injected into the at least one of the one or more predetermined natural flows is less than a minimum amount of the fire suppressing agent sufficient to suppress the fire by flooding the volume; and
   at least one fire detector positioned in an area that includes a said predetermined flame holding region along a respective said one or more predetermined natural flow.

6. The system of claim 5, further comprising a control system for automatically injecting the fire suppressing agent at the injection point in response to actuation of the fire detector.

7. The system of claim 1, wherein the structure comprises an internal combustion engine that defines the volume.

8. A fire suppression system, comprising:
   a jet engine having a source of fuel, an engine air intake and an outlet through which a combusted air fuel mixture is exhausted at a high speed along a first flow path to apply thrust;
   a streamlined enclosure forming a volume around the jet engine, the volume having an air intake and an outlet so that air flows in an air flow path at a speed through the volume between the streamlined enclosure air intake and the streamlined enclosure outlet that is lower than the high speed, wherein the streamlined enclosure defines
      one or more flame holding regions capable of sustaining a spatially stable flame in the presence of an oxidizer and fuel, and
      one or more predetermined natural flows of at least one of an oxidizer and a fuel within the volume that respectively pass through one or more predetermined said flame holding regions;
   a fire suppressing agent; and
   an injection point disposed at the streamlined enclosure with respect to at least one of the one or more predetermined natural flows so that releasing the fire suppressing agent at the injection point into the at least one of the one or more predetermined natural flows causes the at least one of the one or more predetermined natural flows to transport the fire suppressing agent to at least one of the one or more predetermined flame holding regions and so that a minimum amount of the fire suppressing agent sufficient to suppress a fire at the at least one of the one or more predetermined flame holding regions when injected into the at least one of the one or more predetermined natural flows is less than a minimum amount of the fire suppressing agent sufficient to suppress the fire by flooding the volume.

9. The fire suppressing system as in claim 8, wherein the volume formed by the streamlined enclosure comprises a nacelle.

10. The system of claim 8, wherein the fire suppressing agent is transportable by the air flow path to at least one area of recirculation in the volume.

11. The system of claim 8, wherein the at least one of the one or more predetermined natural flows passes through two said predetermined flame hold regions.

12. The system of claim 8, wherein the streamlined enclosure defines multiple said predetermined flame holding regions and at least one respective said predetermined natural flow for each said predetermined flame holding region of the multiple said predetermined flame holding regions, and further comprising a respective said injection point for each said at least one respective said predetermined natural flow.

* * * * *